(12) United States Patent
Kim et al.

(10) Patent No.: US 10,803,602 B2
(45) Date of Patent: Oct. 13, 2020

(54) OBJECT TRACKING METHOD, OBJECT TRACKING APPARATUS, AND RECORDING MEDIUM

(71) Applicant: Panasonic Intellectual Property Management Co., Ltd., Osaka (JP)

(72) Inventors: Min Young Kim, San Jose, CA (US); Sotaro Tsukizawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 106 days.

(21) Appl. No.: 16/171,923

(22) Filed: Oct. 26, 2018

(65) Prior Publication Data
US 2019/0066313 A1 Feb. 28, 2019

Related U.S. Application Data

(63) Continuation of application No. PCT/JP2017/024932, filed on Jul. 7, 2017.
(Continued)

(30) Foreign Application Priority Data

May 17, 2017 (JP) .................................. 2017-098560

(51) Int. Cl.
*G06T 7/246* (2017.01)
*G06K 9/62* (2006.01)
(Continued)

(52) U.S. Cl.
CPC ............ *G06T 7/248* (2017.01); *G06K 9/3241* (2013.01); *G06K 9/46* (2013.01); *G06K 9/4628* (2013.01);
(Continued)

(58) Field of Classification Search
CPC .......... G06T 7/246; G06T 7/248; G06T 7/55; G06T 7/74; G06T 2207/20081;
(Continued)

(56) References Cited

U.S. PATENT DOCUMENTS

2007/0143272 A1\* 6/2007 Kobayashi ............ G06F 16/583
2017/0132472 A1 5/2017 Tao et al.
(Continued)

OTHER PUBLICATIONS

Tao et al. "Siamese instance search for tracking." Proceedings of the IEEE conference on computer vision and pattern recognition. Jun. 2016. (Year: 2016).\*
(Continued)

*Primary Examiner* — Katrina R Fujita
(74) *Attorney, Agent, or Firm* — Greenblum & Bernstein, P.L.C.

(57) ABSTRACT

An object tracking method includes inputting, into a neural network, two or more chronologically consecutive images, and matching similarity by comparing features extracted by the neural network, namely features of each of the two or more input images, and thereby outputting, as an identification result, identification information and position information about one or more objects depicted in a chronologically later image than a chronologically earlier image, which match one or more objects which are tracking candidates depicted in the chronologically earlier image. The neural network includes two or more identical structures having zero or more fully-connected layers and one or more convolution layers, and shares parameters among corresponding layers across the identical structures.

12 Claims, 20 Drawing Sheets

Related U.S. Application Data

(60) Provisional application No. 62/371,962, filed on Aug. 8, 2016.

(51) Int. Cl.
| | | |
|---|---|---|
| *G06T 7/73* | (2017.01) | |
| *G06K 9/46* | (2006.01) | |
| *G06K 9/32* | (2006.01) | |
| *G06T 7/55* | (2017.01) | |
| *G06K 9/00* | (2006.01) | |

(52) U.S. Cl.
CPC ......... *G06K 9/6202* (2013.01); *G06K 9/6215* (2013.01); *G06T 7/246* (2017.01); *G06T 7/74* (2017.01); *G06K 9/00369* (2013.01); *G06K 9/6256* (2013.01); *G06K 2009/3291* (2013.01); *G06T 7/55* (2017.01); *G06T 2207/20081* (2013.01); *G06T 2207/20084* (2013.01); *G06T 2207/30196* (2013.01); *G06T 2207/30232* (2013.01); *G06T 2207/30252* (2013.01)

(58) Field of Classification Search
CPC . G06T 2207/20084; G06T 2207/30196; G06T 2207/30232; G06K 9/00369; G06K 9/3241; G06K 9/36; G06K 9/3628; G06K 9/6202; G06K 9/6215; G06K 9/6256; G06K 2009/3291
See application file for complete search history.

(56) References Cited

U.S. PATENT DOCUMENTS

2017/0206431 A1* 7/2017 Sun .................. G06N 3/084
2018/0005113 A1* 1/2018 Kasagi ............... G06N 3/08

OTHER PUBLICATIONS

International Search Report of PCT application No. PCT/JP2017/024932 dated Aug. 15, 2017.
Quan Gan et al., "First step toward model-free, anonymous object tracking with recurrent neural networks", CoRR abs/1511.06425, Nov. 25, 2015.
Samira Ebrahimi Kahou et al., "RATM: Recurrent Attentive Tracking Model", CoRR abs/1510.08660, Apr. 28, 2016.
Peter Ondruska et al., "Deep Tracking: Seeing Beyond Seeing Using Recurrent Neural Networks", CoRR abs/1602.00991,Feb. 12, 2016.
Xiaolong Wang et al., "Unsupervised Learning of Visual Representations using Videos", 2015 IEEE International Conference on Computer Vision (ICCV), Dec. 7, 2015, pp. 2794-2802.
Bing Wang et al., "Joint Learning of Convolutional Neural Networks and Temporally Constrained Metrics for Tracklet Association", 2016 IEEE Conference on Computer Vision and Pattern Recognition Workshops (CVPRW), Jun. 26, 2016, pp. 386-393.
The Extended European Search Report dated May 20, 2019 for European Patent Application No. 17839122.3.
Bertinetto Luca et al: "Fully-Convolutional Siamese Networks for Object Tracking", Nov. 3, 2016 (Nov. 3, 2016), Image Analysis and Recognition: 11th International Conference, ICIAR 2014, Vilamoura, Portugal, Oct. 22-24, 2014, Proceedings, Part I; In: Lecture Notes in Computer Science, ISSN 1611-3349; vol. 8814; [Lecture Notes in Computer Science; Lect.No. XP047361104.
Minyoung Kim et al: "Similarity Mapping with Enhanced Siamese Network for Multi-Object Tracking", ARXIV.org, Cornell University Library, 201 Olin Library Cornell University Ithaca, NY 14853, Sep. 29, 2016 (Sep. 29, 2016), XP080814333.

* cited by examiner

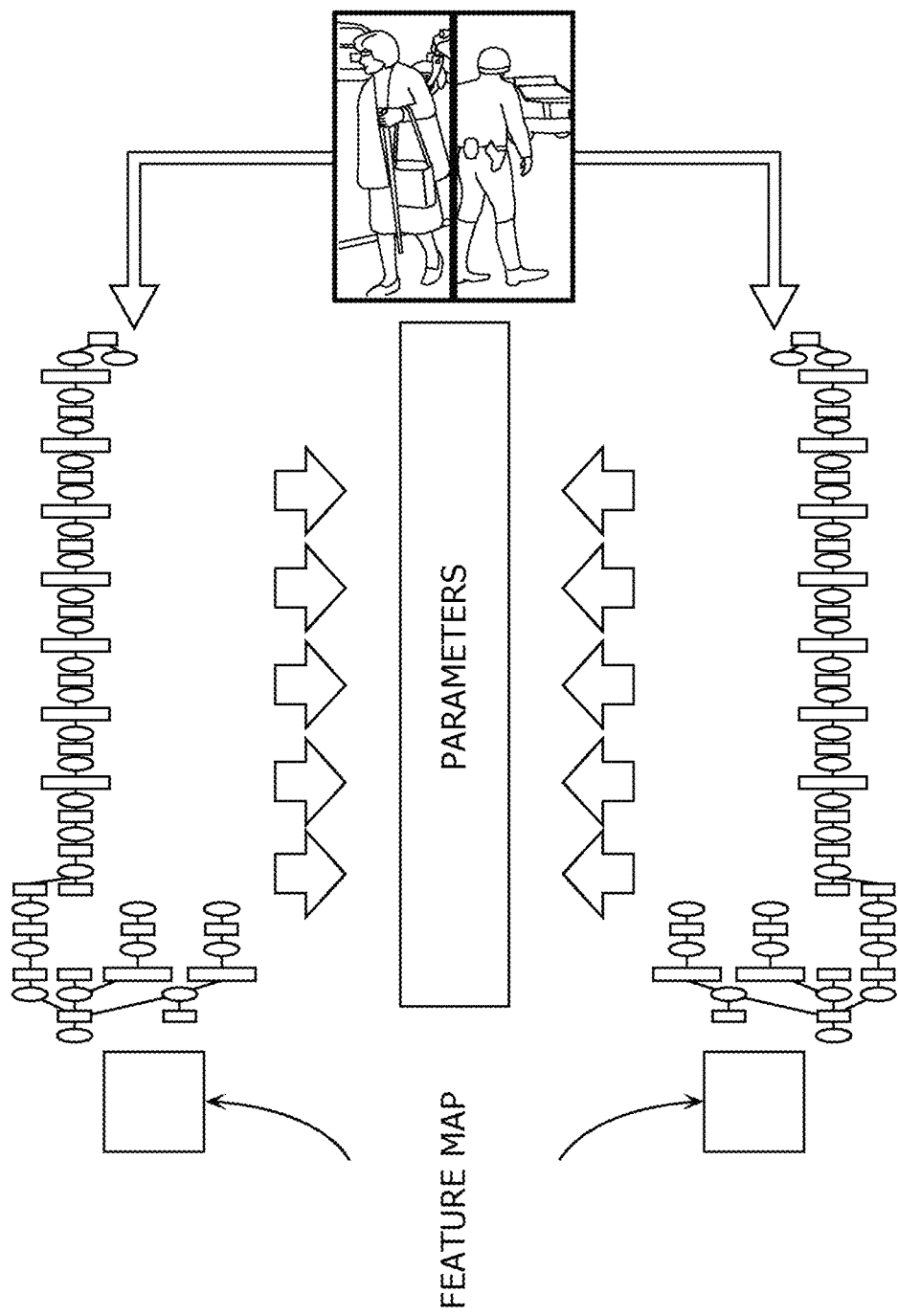

FIG. 20

```
Algorithm 1 Matching Algorithm
1:  procedure MATCH(P, n)                                    ▷ Score matrix as input
2:      exID ← {existing IDs whithin previous n frames}
3:      for i in reversed(sorted(P, score)) do               ▷ sort pairs with score
4:          (ID_exist, ID_tgt) ← P[i]                        ▷ pull candidate pair
5:          if ID_tgt ∉ exID then
6:              continue
7:          end if
8:          if ID_tgt.notAssigned() then
9:              if ID_exist.notAssigned() then
10:                 Target[ID_exist] ← ID_tgt
11:                 ID_exist.setAssigned(True)               ▷ new assignment
12:             else if newID_exist ← FindBetterMatch() then
13:                 ID_exist.setAssigned(False)
14:                 Target[newID_exist] ← ID_tgt
15:                 newID_exist.setAssigned(True)            ▷ switch assignment
16:             end if
17:         end for
18:     end for
19:     for ID_tgt ∈ {leftover tgt IDs} do
20:         exID.append(ID_tgt, f_new)                       ▷ handle new IDs with frame info
21:     end for
22: end procedure
```

FIG. 21

| Name | MOTA | Hz |
|---|---|---|
| MOT16-02 | 17.8 | 11.07 |
| MOT16-04 | 36.2 | 4.12 |
| MOT16-05 | 31.5 | 21.47 |
| MOT16-09 | 47.5 | 10.06 |
| MOT16-10 | 33.0 | 12.18 |
| MOT16-11 | 48.6 | 10.00 |
| MOT16-13 | 6.2 | 27.15 |
| TOTAL | 31 | 9.32 |

FIG. 22

| Method | MOTA | Hz |
|---|---|---|
| NMOT [16] | 46.4 | 2.6 |
| JMC [17] | 43.6 | 0.8 |
| Ours | 35.2 | 5.6 |
| TBD [18] | 33.7 | 1.3 |
| CEM [19] | 33.2 | 0.3 |
| DP_NMS [20] | 32.2 | 212.6 |
| SMOT [21] | 29.7 | 0.2 |
| JPDA_m [22] | 26.2 | 22.2 |

OBJECT TRACKING METHOD, OBJECT TRACKING APPARATUS, AND RECORDING MEDIUM

BACKGROUND

1. Technical Field

The present disclosure relates to an object tracking method, an object tracking apparatus, and a recording medium, and more particularly relates to an object tracking method, an object tracking apparatus, and a recording medium executed by a computer using a neural network.

2. Description of the Related Art

For example, the use of deep learning for object tracking technology that tracks multiple target objects appearing in a moving image has been proposed (for example, see: Gan, Q., Guo, Q., Zhang, Z., Cho, K.: First step toward model-free, anonymous object tracking with recurrent neural networks. CoRR abs/1511.06425; Kahou, S. E., Michalski, V., Memisevic, R.: RATM: recurrent attentive tracking model. CoRR abs/1510.08660(2015); and Ondruska, P., Posner, I.: Deep tracking: Seeing beyond seeing using recurrent neural networks. CoRR abs/1602.00991(2016)). In the above literature, a recurrent neural network able to handle chronological information is utilized for the neural network used in deep learning. With this arrangement, temporal information such as the flows of multiple objects appearing among moving images can be handled, and thus object tracking technology using deep learning may be realized.

SUMMARY

In one general aspect, the techniques disclosed here feature an object tracking method executed by a computer using a neural network, comprising: inputting, into the neural network, two or more chronologically consecutive images, each depicting one or more objects; and matching similarity by comparing features extracted by the neural network, namely features of each of the two or more input images, and thereby outputting, as an identification result, identification information and position information about one or more objects depicted in a chronologically later image than a chronologically earlier image, which match one or more objects which are tracking candidates depicted in the chronologically earlier image among the two or more images, wherein the neural network includes two or more identical structures having zero or more fully-connected layers and one or more convolution layers, and shares parameters among corresponding layers across the identical structures.

According to the object tracking method and the like of the present disclosure, the processing speed of object tracking using deep learning may be improved further.

It should be noted that general or specific embodiments may be implemented as a system, a method, an integrated circuit, a computer program, a computer-readable recording medium such as a CD-ROM disc, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram illustrating a representation of a process executed by the object tracking apparatus according to the embodiment;

FIG. 20 is a diagram illustrating an example of a designated algorithm according to Working Example 1;

FIG. 21 is a diagram illustrating benchmark results for the MOT16 Train Data set according to Working Example 2; and FIG. 22 is a diagram illustrating benchmark results for the MOT16 Test Data set according to Working Example 2.

Figure 1:
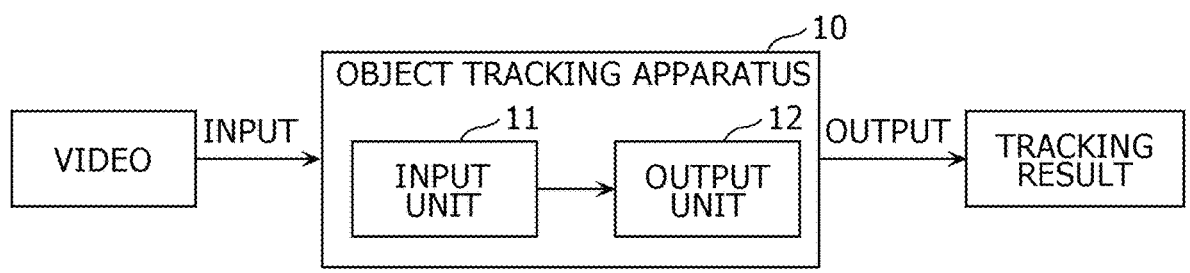
FIG. 1 is a block diagram illustrating an example of a configuration of an object tracking apparatus according to an embodiment.

DETAILED DESCRIPTION (Background Leading Up to the Present Disclosure)

Object tracking has been developing rapidly, along with increased interest in machine vision perception. In addition, due to increased interest in high-level understanding of objects, object tracking is becoming one of the most active topics in computer vision. There already exist wide approaches to improve tracking performance, such as changing the goal from operating heteronomously by a surveillance system to operating autonomously, and even in the field of sports analytics.

However, for machine vision to execute object tracking, it is necessary to adjust a large number of parameters that depend on the data set, which becomes a critical limitation for applications to systems where real-time object tracking is demanded, such as ADAS.

In the past few years, deep neural networks (DNNs) have come to be used widely because of the ability to learn rich features. For this reason, technologies that construct object tracking systems using DNNs are being actively proposed (for example, Gan, Q., Guo, Q., Zhang, Z., Cho, K.: First step toward model-free, anonymous object tracking with recurrent neural networks. CoRR abs/1511.06425; Kahou, S. E., Michalski, V., Memisevic, R.: RATM: recurrent attentive tracking model. CoRR abs/1510.08660(2015); and Ondruska, P., Posner, I.: Deep tracking: Seeing beyond seeing using recurrent neural networks. CoRR abs/1602.00991(2016)). In the above literature, as described above, a recurrent neural network (RNN), which can incorporate temporal information (chronological information) such as the movement flow of an object, is utilized in the neural network to use for deep learning. Temporal information such as the movement flow of an object is important not only for the flow relationships of target objects in a moving image, but also for the tracking of an object across moving images.

However, since the object tracking technologies using deep learning proposed in the above literature utilize recurrent neural networks, the computational requirements are extensive, and the processing speed is slow.

For this reason, for example, in a system where real-time object tracking is demanded, such as the Advanced Driver Assistance System (ADAS), which is a system of advance detection and avoidance of possible accidents, the object tracking technologies are difficult to apply.

The present disclosure has been devised in light of the above circumstances, and provides an object tracking method, an object tracking apparatus, and a recording medium capable of further improving the processing speed of object tracking using deep learning.

An object tracking method according to an aspect of the present disclosure is an object tracking method executed by a computer using a neural network, comprising: inputting, into the neural network, two or more chronologically consecutive images, each depicting one or more objects; and matching similarity by comparing features extracted by the neural network, namely features of each of the two or more input images, and thereby outputting, as an identification result, identification information and position information about one or more objects depicted in a chronologically later image than a chronologically earlier image, which match one or more objects which are tracking candidates depicted in the chronologically earlier image among the two or more images, wherein the neural network includes two or more identical structures having zero or more fully-connected layers and one or more convolution layers, and shares parameters among corresponding layers across the identical structures.

With this arrangement, an object tracking method capable of further improving the processing speed of object tracking using deep learning may be realized.

Herein, a configuration is also possible in which, for example, in the inputting, a first image and a second image which are chronologically consecutive, each depicting one or more objects, are input into the neural network, in the outputting, the neural network is made to extract a first feature of each of one or more objects which are tracking candidates depicted in the input first image, and a second feature of each of one or more objects depicted in the second image, and the similarity is matched by comparing the extracted first feature and the second feature, thereby outputting, as an identification result, identification information and position information about one or more objects depicted in the second image that match each tracking candidate depicted in the first image, and the neural network includes two of the identical structures, and extracts the first feature of the first image and the second feature of the second image with the two identical structures.

A configuration is also possible in which, for example, in the inputting, a first image, a second image, and a third image which are chronologically consecutive, each depicting one or more objects, are input into the neural network, in the outputting, the neural network is made to extract a first feature of each of one or more objects which are tracking candidates depicted in the input first image, a second feature of each of one or more objects depicted in the second image, and a third feature of each of one or more objects depicted in the third image, and the similarity is matched by comparing the extracted first feature, second feature, and third feature, thereby outputting, as an identification result, identification information and position information about one or more objects depicted in the second image and the third image that match each tracking candidate depicted in the first image, and the neural network includes three of the identical structures, and extracts the first feature of the first image, the second feature of the second image, and the third feature of the third image with the three identical structures.

A configuration is also possible in which, for example, the object tracking method further comprises: executing a training that, before executing the inputting, uses training data including multiple matching pairs, which are two or more images depicting identical objects, and non-matching pairs, which are two or more images depicting non-identical objects, to train parameters for causing the neural network to extract features indicating identical objects in the similarity matching by comparison from each of the matching pairs.

A configuration is also possible in which, for example, the neural network additionally includes, outside of the two or more identical structures, additional layers that compute position variants and area variants in an image of the one or more objects depicted in the two or more input images.

A configuration is also possible in which, for example, the object tracking method further comprises: executing a first training that, before executing the inputting, uses training data including multiple matching pairs, which are two or more images depicting identical objects, and non-matching pairs, which are two or more images depicting non-identical objects, to train parameters for causing the two or more identical structures included in the neural network to extract features indicating identical objects in the similarity matching by comparison from each of the matching pairs; and executing a second training that uses the training data to train the parameters for causing the neural network in which the parameters trained in the first training are reflected in the two or more identical structures to extract features indicating identical objects in the similarity matching by comparison from each of the matching pairs.

A configuration is also possible in which, for example, the similarity by comparison is evaluated by comparing a distance of the features of each of the two or more input images extracted by the two or more identical structures.

A configuration is also possible in which, for example, the similarity by comparison is evaluated by using a loss function using a Euclidean distance of the features of each of the two or more images.

A configuration is also possible in which, for example, each of the two or more identical structures extracts a feature of a corresponding image among the two or more input images by a dimensionality further reduced than the dimensionality of the image, and the dimensionality of the features extracted by each of the two or more identical structures is the same.

A configuration is also possible in which, for example, the one or more objects depicted in the two or more images are at least one of a person and a vehicle.

The embodiments described hereinafter all illustrate specific examples of the present disclosure. Features such as numerical values, shapes, structural elements, steps, and the ordering of steps indicated in the following embodiments are merely examples, and are not intended to limit the present disclosure. In addition, among the structural elements in the following exemplary embodiments, structural elements that are not described in the independent claim indicating the broadest concept are described as arbitrary or optional structural elements. Furthermore, the individual contents in all of the embodiments may also be combined.

Embodiment 1

Hereinafter, an object tracking method and the like of an object tracking apparatus 10 according to Embodiment 1 will be described with reference to the drawings.

[Configuration of Information Processing Apparatus 10]

Figure 2:
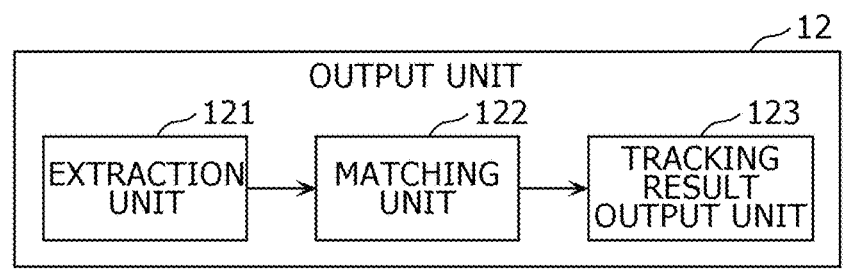
FIG. 2 is a block diagram illustrating an example of a detailed configuration of the output unit illustrated in FIG. 1.

FIG. 1 is a block diagram illustrating an example of the configuration of the object tracking apparatus 10 according to the present embodiment. FIG. 2 is a block diagram illustrating an example of the detailed configuration of the output unit 12 illustrated in FIG. 1.

The object tracking apparatus 10 is realized by a computer or the like using a neural network, and includes an input unit 11 and an output unit 12 as illustrated in FIG. 1. When video depicting a tracking target is input, the object tracking apparatus 10 outputs a tracking result including identification information and position information about the object of the tracking target. Note that the object tracking apparatus 10 may also output video to which the tracking result is attached.

<Input Unit 11>

The input unit 11 inputs into the neural network two or more chronologically consecutive images, each depicting one or more objects. More specifically, the input unit 11 inputs into the neural network a first image and a second image which are chronologically consecutive, each depicting one or more objects. Note that the input unit 11 may also input into the neural network a first image, a second image, and a third image which are chronologically consecutive, each depicting one or more objects.

In the present embodiment, the input unit 11 is described as inputting two chronologically consecutive images, namely a first image and a second image, into an extraction unit 121 of the output unit 12. Note that the input unit 11 may also input three chronologically consecutive images, namely a first image, a second image, and a third image, into the extraction unit 121 of the output unit 12. Also, the one or more objects may be at least one of a person and a vehicle, but may also be something else.

<Output Unit 12>

As illustrated in FIG. 2, the output unit 12 is provided with an extraction unit 121, a matching unit 122, and a tracking result output unit 123. The output unit 12 outputs a tracking result with respect to the video input into the input unit 11. For example, in the chronological images included in the video input into the input unit 11, identification information and position information about an object included in a chronologically later image that matches the tracking target object included in a chronologically earlier image is output as a tracking result. Note that the output unit 12 may also output the tracking result attached to the video input into the input unit 11. In other words, the output unit 12 may output a video in which the same identification information as the identification information given to the same object included in a chronologically earlier image is given to an object included in a chronologically later image.

<<Extraction Unit 121>>

The extraction unit 121 uses the neural network to extract features (a feature map) from each of the two or more images input by the input unit 11. In other words, the features may also be a feature map. Herein, the neural network includes two or more identical structures having zero or more fully-connected layers and one or more convolution layers, and shares parameters among the corresponding layers across the identical structures. Furthermore, outside of the two or more identical structures, the neural network includes additional layers that compute position variants and area variants in an image of the one or more objects depicted in the two or more images input by the input unit 11. In addition, the two or more identical structures extract the features of a corresponding image among the two or more images input by the input unit 11 by a dimensionality further reduced than the dimensionality of the images, and the dimensionality of the features extracted by each of the two or more identical structures is the same.

In the present embodiment, the extraction unit 121 uses a neural network that includes two identical structures having zero or more fully-connected layers and one or more convolution layers, shares parameters among the corresponding layers across the identical structures, and outside of the two identical structures, includes additional layers that compute position variants and area variants in an image of the one or more objects depicted in the two images input by the input unit 11. In addition, the extraction unit 121 uses the neural network to extract a first feature of each of the one or more objects which are tracking candidates depicted in the first image input by the input unit 11, and a second feature of each of the one or more objects depicted in the second image.

Note that in the case in which three chronologically consecutive images, namely a first image, a second image, and a third image, are input by the input unit 11, the extraction unit 121 may also use a neural network that includes three identical structures having zero or more fully-connected layers and one or more convolution layers, shares parameters among the corresponding layers across the identical structures, and outside of the three identical structures, includes additional layers that compute position variants and area variants in an image of the one or more objects depicted in the three images input by the input unit 11. In other words, the extraction unit 121 may also use the neural network to extract a first feature of each of the one or more objects which are tracking candidates depicted in the first image input by the input unit 11, a second feature of each of the one or more objects depicted in the second image, and a third feature of each of the one or more objects depicted in the third image.

Figure 3:
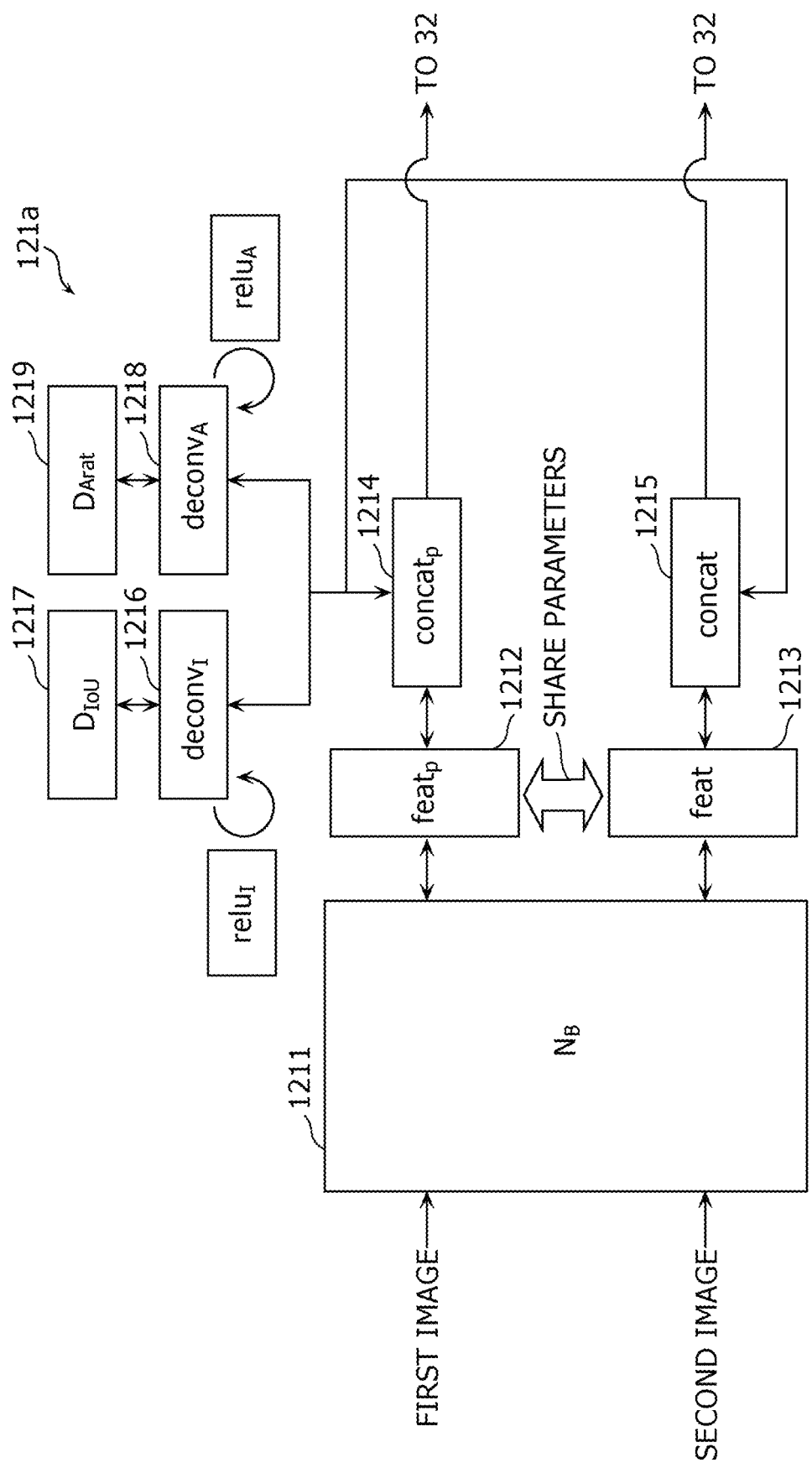
FIG. 3 is an explanatory diagram of an example of the structure of a neural network used by the extraction unit illustrated in FIG. 2.
Figure 4:
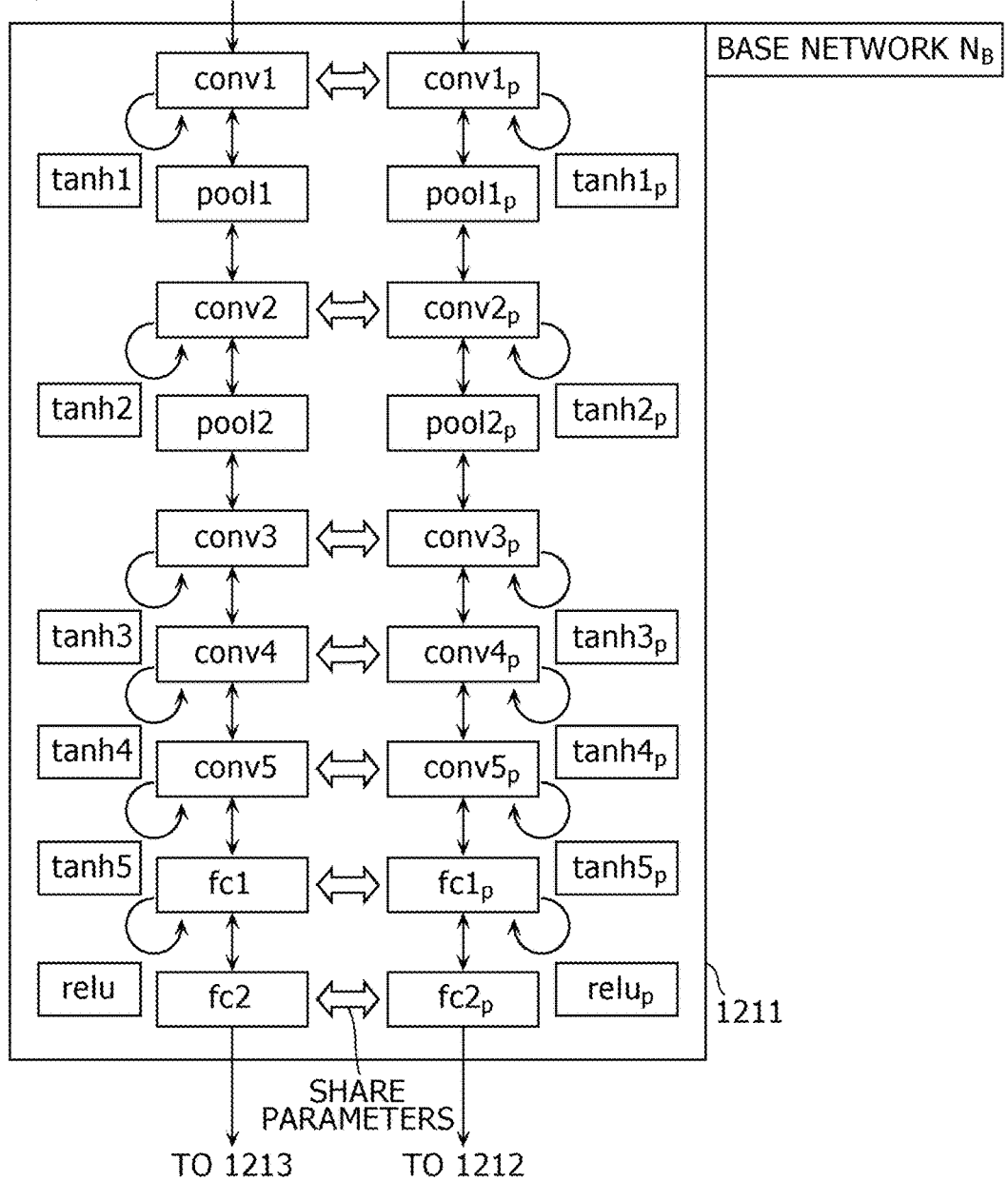
FIG. 4 is an explanatory diagram of an example of the structure of the base neural network illustrated in FIG. 3.

Herein, an example of the structure of the neural network used by the extraction unit 121 according to the present embodiment will be described. FIG. 3 is an explanatory diagram of an example of the structure of a neural network 121*a* used by the extraction unit 121 illustrated in FIG. 2. FIG. 4 is an explanatory diagram of an example of the structure of the base neural network 1211 illustrated in FIG. 3.

The structure of the neural network 121*a* used by the extraction unit 121 of the present embodiment corresponds to an enhancement of the base neural network 1211 ($N_B$) illustrated in FIG. 4, for example.

The base neural network 1211 illustrated in FIG. 4 includes two identical structures having five convolution layers (conv1 to conv5), two pooling layers (pool1, pool2), and two fully-connected layers (fc1, fc2), and shares parameters between the corresponding five convolution layers and the two fully-connected layers across the identical structures. Note that a neural network that shares parameters between corresponding players of the same structure except pooling layers in this way is also called a siamese neural network.

As illustrated in FIG. 4, in each convolution layer, the hyperbolic tangent (tanh) is used as an activation function, for example. Also, in the first fully-connected layer (fc1), a ramp function (Rectified Linear Unit (ReLU)) is used as an activation function, for example. The size of the filter, that is, the kernel size, is taken to be 5×5 in conv1, 2×2 in pool1, 3×3 in conv2, 2×2 in pool2, 3×3 in conv3, 2×2 in conv4, 2×2 in conv5, 2048 in fc1, and 1024 in fc2, for example. Note that these are merely an example, and activation functions and kernel sizes which are different from the above may also be set. Also, in the base neural network 1211 illustrated in FIG. 4, a case in which five convolution layers are included in the identical structures is given as an example, but the configuration is not limited thereto. If the number of convolution layers in the identical structures is increased, the recognition precision when extracting features from an image is improved, while the computation complexity and required processing time increases. For this reason, the number may be decided appropriately.

In any case, it is sufficient for the base neural network 1211 to have two more identical structures, and share parameters between the corresponding layers of the structures. Additionally, such a base neural network 1211 is able to extract features from the input first image and second image by the same dimensionality and a dimensionality further reduced than the dimensionality of the first image and the second image.

Outside of the base neural network 1211 illustrated in FIG. 4, the neural network 121*a* illustrated in FIG. 3 also at least includes an additional layer 1217 and an additional layer 1219 that compute the position variants and area variants in an image of one or more objects depicted in the two or more images input by the input unit 11. Also, outside of the base neural network 1211 illustrated in FIG. 4, the neural network 121*a* includes a feature layer 1212 and a feature layer 1213. Note that the neural network 121*a* is an enhancement of a siamese neural network, namely the base neural network 1211 ($N_B$: Base Network), and thus is also designated an enhanced siamese neural network (ESNN) in some cases.

More specifically, the neural network 121*a* illustrated in FIG. 3 is made up of the base neural network 1211, the feature layer 1212, the feature layer 1213, a feature concatenation layer 1214, a feature concatenation layer 1215, a dimensionality processing layer 1216, a dimensionality processing layer 1218, the additional layer 1217, and the additional layer 1219.

The feature layer 1212 is a layer that outputs, for example, two-dimensional or four-dimensional features (a feature map) for the first image extracted by the base neural network 1211. In other words, the kernel size of the feature layer 1212 is 2 or 4. The features of the first image output by the feature layer 1212 in this way are greatly reduced compared to the dimensionality (several million) of the first image. Similarly, the feature layer 1213 is a layer that outputs, for example, two-dimensional or four-dimensional features (a feature map) for the second image extracted by the base neural network 1211. In other words, the kernel size of the feature layer 1213 is 2 or 4. The features of the second image output by the feature layer 1213 in this way are greatly reduced compared to the dimensionality (several million) of the second image. Note that the kernel size of the feature layer 1212 and the feature layer 1213 is not limited to 2 or 4, and may be 1 or greater.

Note that the feature layer 1212 and the feature layer 1213 are positioned outside of the base neural network 1211, but are also output layers of the base neural network 1211.

The dimensionality processing layer 1216 is made up of a convolution layer that uses a ramp function (Rectified Linear Unit (ReLU)) as an activation function, for example, and executes a process of increasing the dimensionality and a process of decreasing the dimensionality. The dimensionality processing layer 1216 increases the dimensionality of the features held in the feature layer 1212 and the feature layer 1213, and inputs into the additional layer 1217. Also, the dimensionality processing layer 1216 decreases the dimensionality of a position score output by the additional layer 1217, and inputs into the feature concatenation layer 1214 and the feature concatenation layer 1215.

Similarly, the dimensionality processing layer 1218 is made up of a convolution layer that uses a ramp function (Rectified Linear Unit (ReLU)) as an activation function, for example, and executes a process of increasing the dimensionality and a process of decreasing the dimensionality. The dimensionality processing layer 1218 increases the dimensionality of the features held in the feature layer 1212 and the feature layer 1213, and inputs into the additional layer 1219. Also, the dimensionality processing layer 1218 decreases the dimensionality of an area size score output by the additional layer 1217, and inputs into the feature concatenation layer 1214 and the feature concatenation layer 1215.

The additional layer 1217 computes position variants of one or more objects appearing in the first image and the second image, that is, the tracking target objects, as additional features. The additional layer 1217 executes the calculation in areas of boxes that include the tracking target objects illustrated in the first image and the second image (area of intersection/area of union), for example. In this way, by calculating the Intersection-over-Union (IoU), the additional layer 1217 computes the position variants of the tracking target objects as additional features.

The additional layer 1219 computes variants in the area sizes of one or more objects appearing in the first image and the second image, that is, the tracking target objects, as additional features. The additional layer 1219 executes the calculation in areas of boxes that indicate the tracking target objects illustrated in the first image and the second image (minimum area/maximum area), for example. In this way, by calculating the change in the area size as an area ratio, the additional layer 1219 computes the area variants of the tracking target objects as additional features.

Note that the dimensionality processing layer 1216 and the dimensionality processing layer 1218 are necessary if the dimensionality is different between the features held in the feature layer 1212 and the feature layer 1213, and the additional features computed in the additional layer 1217 and the additional layer 1219, but are not necessary if the dimensionality is the same.

The feature concatenation layer 1214 concatenates the features in the first image included in the feature layer 1212 with the additional features computed in the additional layer 1217 and the additional layer 1219. Similarly, the feature concatenation layer 1215 concatenates the features in the second image included in the feature layer 1213 with the additional features computed in the additional layer 1217 and the additional layer 1219.

With this arrangement, the extraction unit 121 uses the neural network 121a to extract features (a feature map) from each of the two or more images input into the input unit 11, and thereby is able to obtain the similarity in the images of tracking candidates while accounting for position variants and area variants of the tracking candidates. Note that the feature map may be obtained in the form of a similarity matrix, or may be obtained in the form of a vector representation. Also, since the feature map indicates the similarity in the images of tracking candidates, the feature map is also designated a similarity mapping in some cases.

<<Matching Unit 122>>

The matching unit 122 matches the features (feature map) extracted by the neural network. In the present embodiment, the matching unit 122 matches the first features of each of one or more objects which are tracking candidates depicted in the first image extracted by the extraction unit 121 with second features of each of one or more objects depicted in the second image. More specifically, the matching unit 122 uses a designated algorithm to match the first features and the second features extracted by the extraction unit 121. For example, the matching unit 122 uses the Euclidean distance to score the distances between the first features and the second features extracted by the extraction unit 121, and thereby matches the similarity in the images of tracking candidates while accounting for position variants and area variants of the tracking candidates. Note that the method of scoring the distances between the first features and the second features is not limited to the case of using the Euclidean distance. For example, the Manhattan distance or the Mahalanobis distance may also be used.

Note that in the case in which three chronologically consecutive images, namely a first image, a second image, and a third image are input by the input unit 11, it is sufficient to match the first features, the second features, and the third features extracted by the extraction unit 121.

<<Tracking Result Output Unit 123>>

The tracking result output unit 123 outputs, as an identification result, identification information and position information about one or more objects depicted in a chronologically later image than an earlier image, which match one or more objects which are tracking candidates depicted in the chronologically earlier image among the two or more images.

In the present embodiment, the tracking result output unit 123 outputs, as an identification result, identification information and position information about one or more objects depicted in the second image which match each tracking candidate depicted in the first image. Also, in the case in which three chronologically consecutive images, namely a first image, a second image, and a third image are input by the input unit 11, the tracking result output unit 123 outputs, as an identification result, identification information and position information about one or more objects depicted in the second image and the third image which match each tracking candidate depicted in the first image.

Note that the tracking result output unit 123 may also output a second image with attached identification information indicating the same object as each tracking candidate depicted in the first image. For example, in the case in which an identification number for example is attached to a tracking candidate depicted in the first image, the tracking result output unit 123 may output, as an identification result, a second image in which the same identification number is attached to the tracking candidate depicted in the second image of the same object as the tracking candidate depicted in the first image.

Also, in the case in which three chronologically consecutive images, namely a first image, a second image, and a third image are input by the input unit 11, the tracking result output unit 123 may also, as an identification result, a second image and a third image in which identification information indicating the same object as each tracking candidate depicted in the first image is attached to one or more objects depicted in the second image and the third image which match each tracking candidate depicted in the first image.

[Operations and the Like of Object Tracking Apparatus 10]

Next, operations and the like of the object tracking apparatus 10 configured as above will be described.

Figure 5:
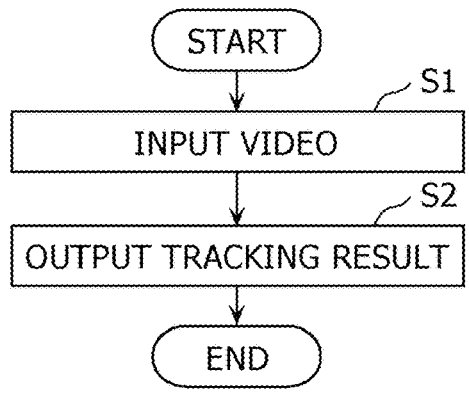
FIG. 5 is a flowchart illustrating an exemplary process of the object tracking apparatus according to the embodiment.
Figure 6A:
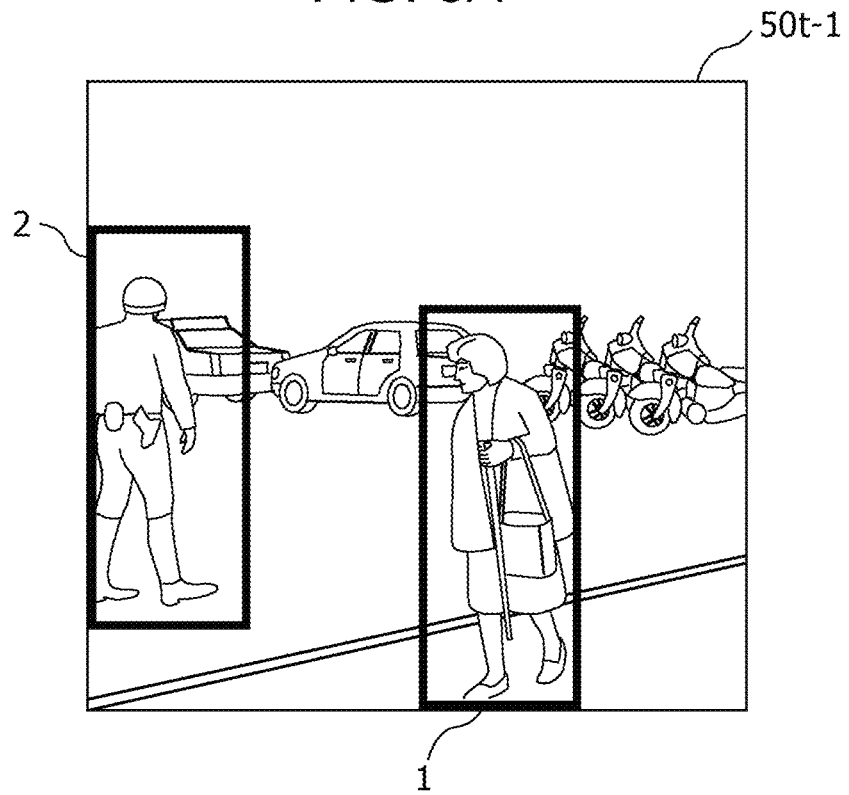
FIG. 6A is a diagram illustrating an example of an input image into the object tracking apparatus according to the embodiment.
Figure 6B:
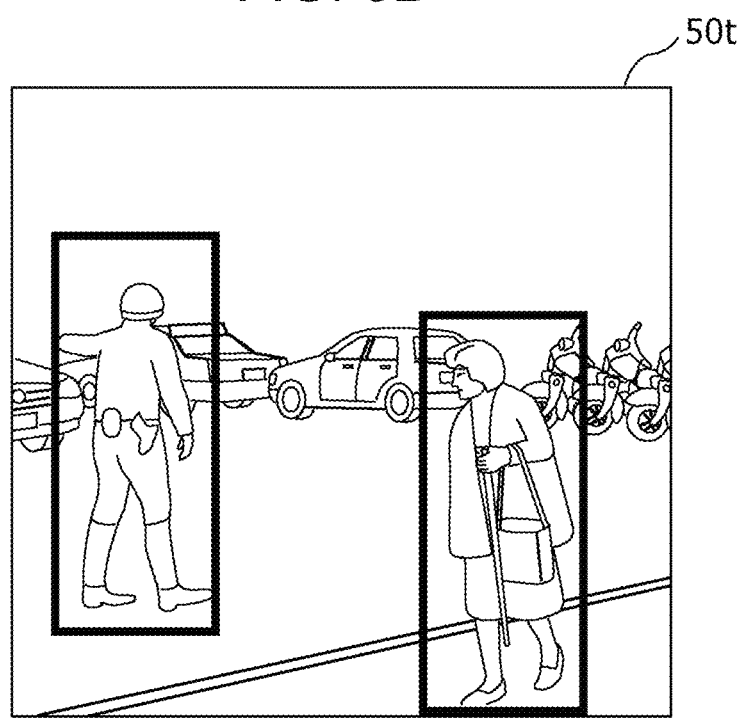
FIG. 6B is a diagram illustrating an example of an input image into the object tracking apparatus according to the embodiment.
Figure 8:
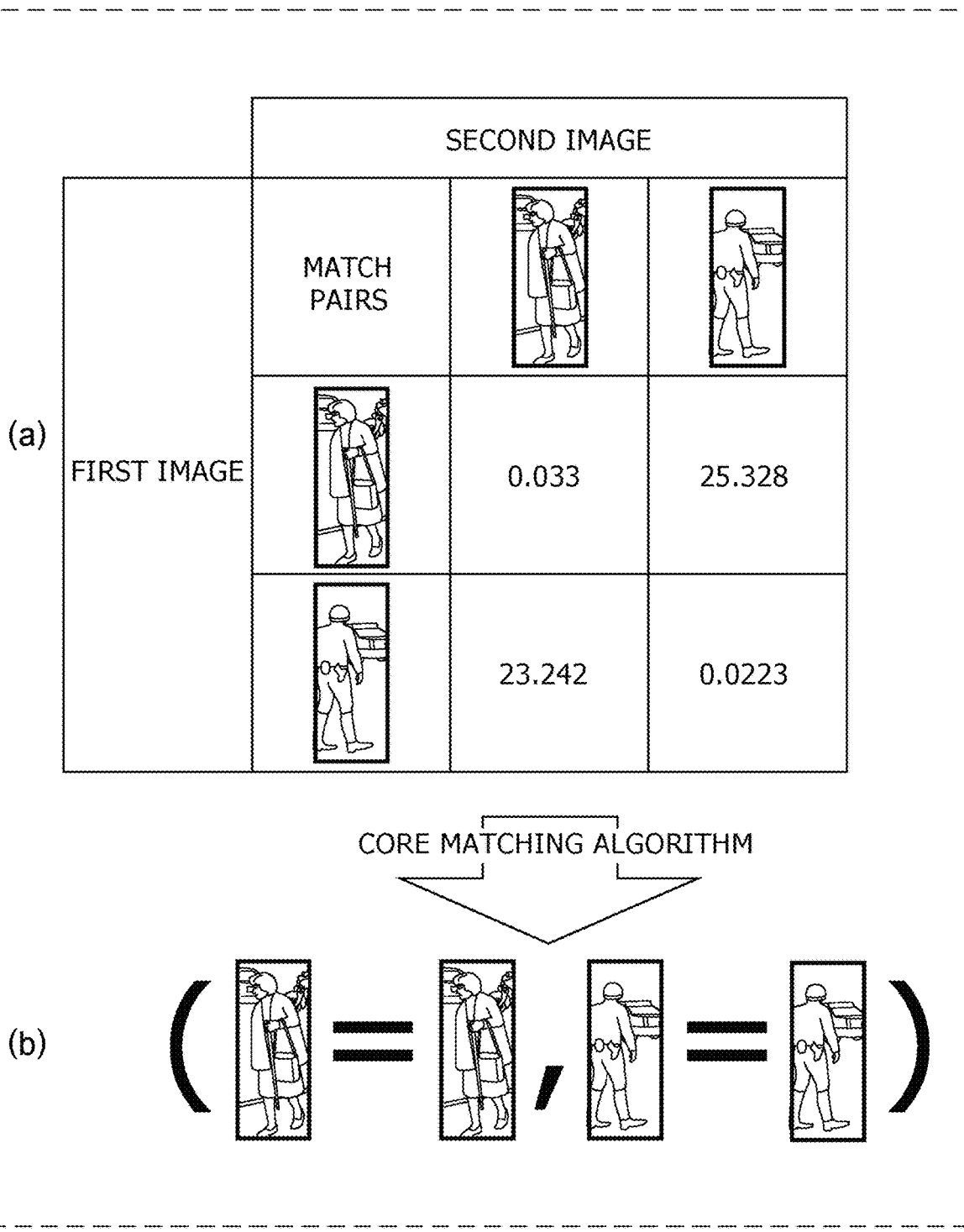
FIG. 8 is a diagram illustrating a representation of a process executed by the object tracking apparatus according to the embodiment.
Figure 9A:
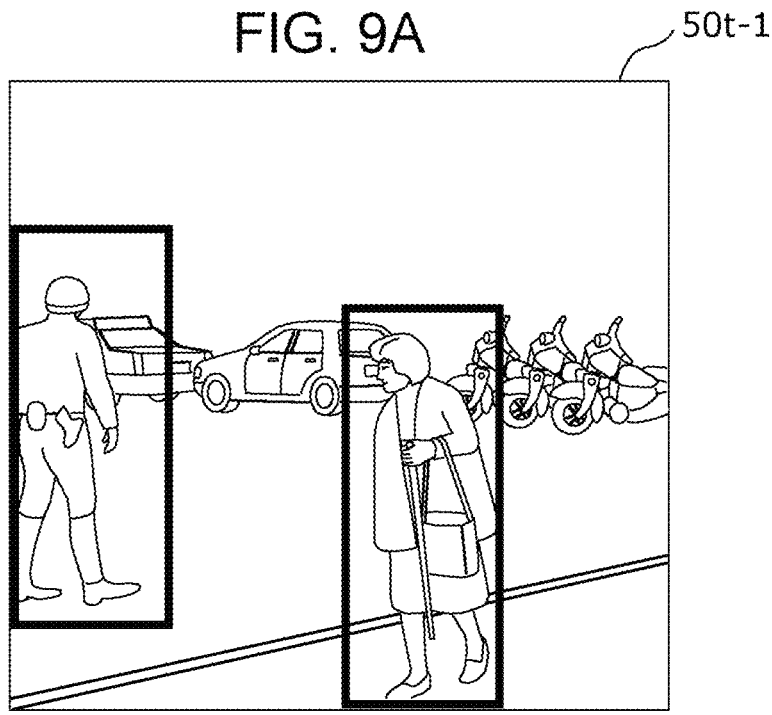
FIG. 9A is a diagram illustrating an example of a process result of the object tracking apparatus according to the embodiment.
Figure 9B:
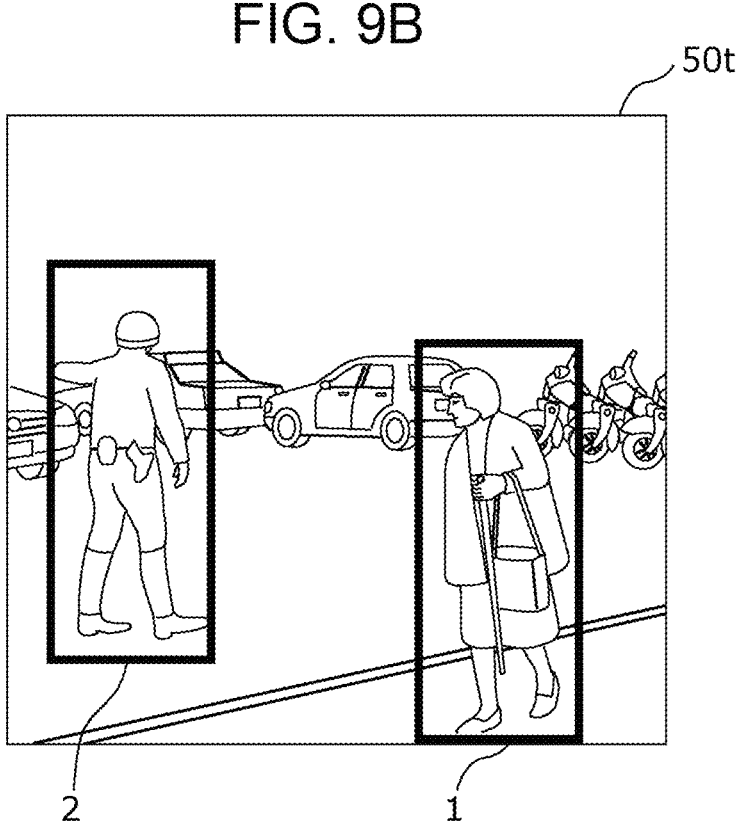
FIG. 9B is a diagram illustrating an example of a process result of the object tracking apparatus according to the embodiment.

FIG. 5 is a flowchart illustrating an exemplary process of the object tracking apparatus 10 according to the present embodiment. FIGS. 6A and 6B are diagrams illustrating examples of input images into the object tracking apparatus 10 according to the present embodiment. FIGS. 7 and 8 are diagrams illustrating representations of the process executed by the object tracking apparatus 10 according to the present embodiment. FIGS. 9A and 9B are diagrams illustrating examples of process results of the object tracking apparatus 10 according to the present embodiment.

First, video depicting tracking targets is input into the object tracking apparatus 10 (S1). More specifically, the computer of the object tracking apparatus 10 inputs into the neural network 121a two or more chronologically consecutive images from among the images constituting the video, each image depicting one or more objects. For example, the computer of the object tracking apparatus 10 inputs into the neural network 121a the chronologically consecutive images $50_{t-1}$ and $50_t$ depicting tracking targets as illustrated in FIGS. 6A and 6B.

Herein, the image $50_{t-1}$ illustrated in FIG. 6A is an example of the chronologically earlier first image input into the object tracking apparatus 10, and the identification numbers 1 and 2 are assigned to boxes, which are areas including two persons which are the tracking targets. On the other hand, the image $50_t$ illustrated in FIG. 6B is an example of the chronologically later second image input into the object tracking apparatus 10, and identification numbers are not assigned to boxes, which are areas including two persons which are the tracking targets.

Next, the computer of the object tracking apparatus 10 causes the neural network 121a to estimate feature maps, that is, features of the tracking target objects in the two or more images input in S1, and outputs a tracking result obtained by matching the estimated feature maps.

More specifically, the computer of the object tracking apparatus 10 first causes the neural network 121a to extract the feature maps, that is, the features of each of the two or more images input in S1. In the example illustrated in FIG. 7, a representation of a process that extracts feature maps using the neural network 121a that shares parameters between the corresponding layers of identical structures is illustrated.

Next, the computer of the object tracking apparatus 10 matches the feature maps obtained using the neural network 121a, and thereby identifies one or more objects depicted in the chronologically later image which match the one or more objects which are the tracking candidates depicted in the chronologically earlier image. The example illustrated in FIG. 8 illustrates a representation of a process of identifying whether or not a person is the same person by comparing the feature maps of a tracking target person included in a box of the first image, namely the image $50_{t-1}$ and a tracking target person included in a box of the second image, namely the image $50_t$, with a designated matching algorithm to thereby compare the similarity.

Additionally, the computer of the object tracking apparatus 10 outputs, as an identification result, identification information and position information about one or more objects depicted in a chronologically later image which match one or more objects which are tracking candidates depicted in the chronologically earlier image. In the present embodiment, the computer of the object tracking apparatus 10 outputs, as the tracking result, the later image attached with identification information indicating that the one or more objects depicted in the later image are the same objects as each tracking candidate depicted in the earlier image. For example, the computer of the object tracking apparatus 10 attaches the same number as the identification number attached to the box including the tracking target person depicted in the image $50_{t-1}$ illustrated in FIG. 9A to the box including a person depicted in the image $50_t$ illustrated in FIG. 9B, who is the same person as the tracking target person depicted in the image $50_{t-1}$ illustrated in FIG. 9A. Herein, the box is an example of the position information, and the identification number is an example of the identification information.

Herein, the image $50_{t-1}$ illustrated in FIG. 9A is an example of the same first image as FIG. 6A. On the other hand, the image $50_t$ illustrated in FIG. 9B is an example of the same second image as FIG. 6B, but identification numbers have been attached as a tracking result to the boxes which are the areas including the two persons who are the tracking targets.

[Training Process of Object Tracking Apparatus 10]

Hereinafter, a training process for realizing such an object tracking apparatus 10 will be described. In the present embodiment, first, the siamese neural network (base neural network 1211) is trained, and after that, a second-stage training that trains the enhanced siamese neural network (neural network 121a) is executed. In the following description, the siamese neural network used in the first-stage training is designated the base neural network 1211a, and the enhanced siamese neural network used in the second-stage training is designated the neural network 121b.

Figure 10:
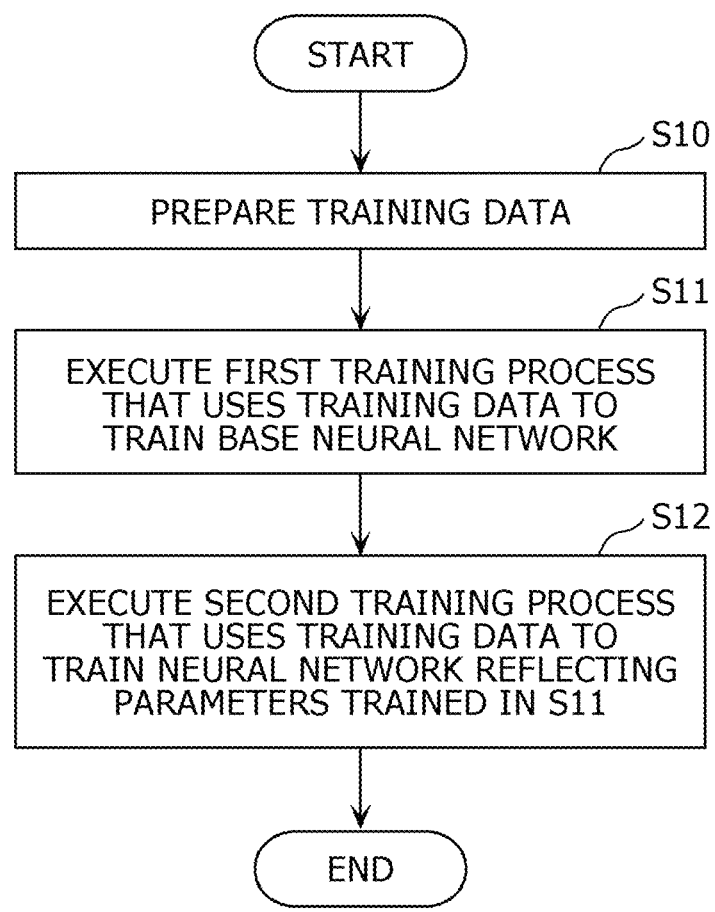
FIG. 10 is a flowchart illustrating an outline of a training process according to the embodiment.
Figure 11:
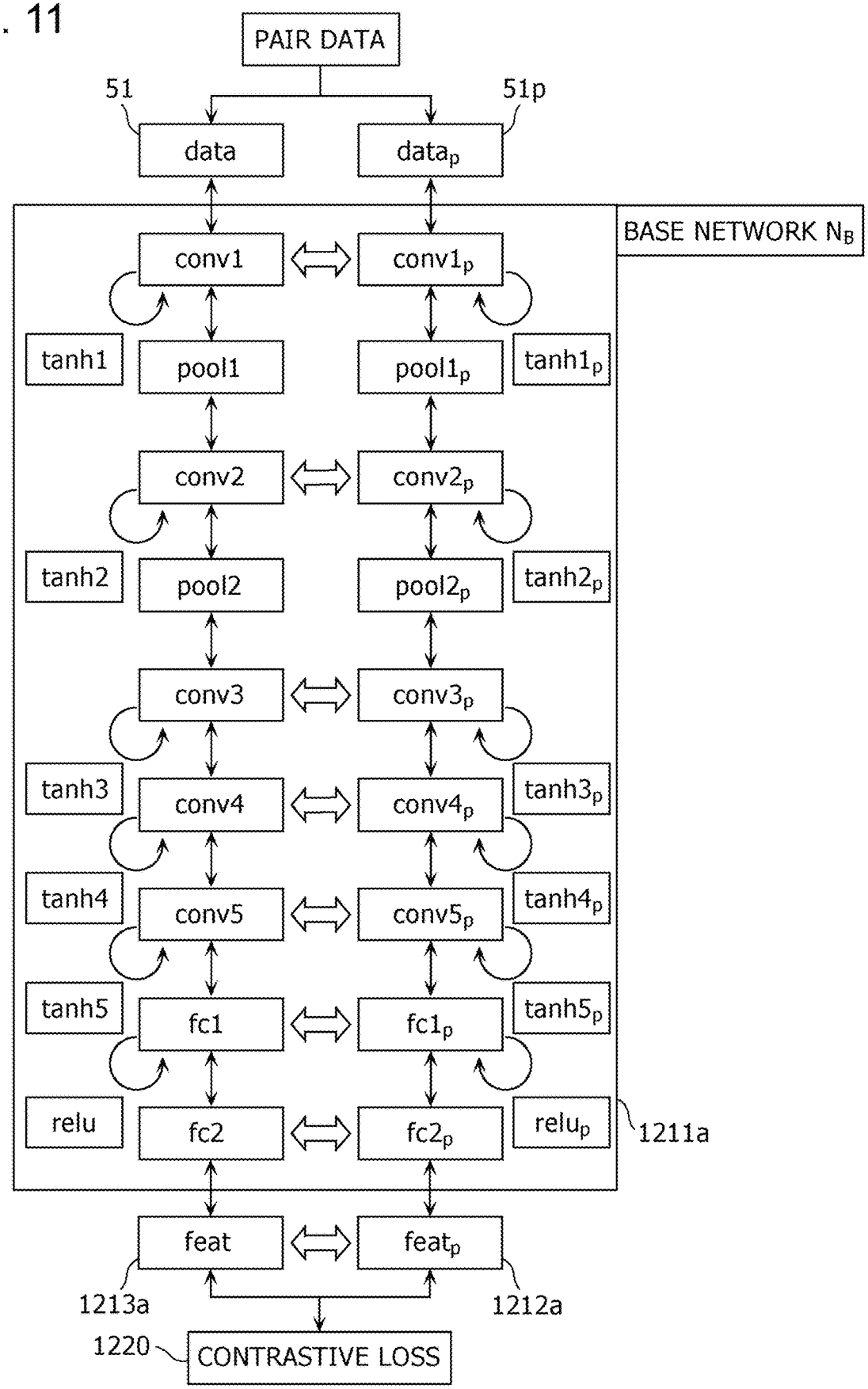
FIG. 11 is an explanatory diagram of an example of the structure of a base neural network used in a first-stage training process according to the embodiment.
Figure 12:
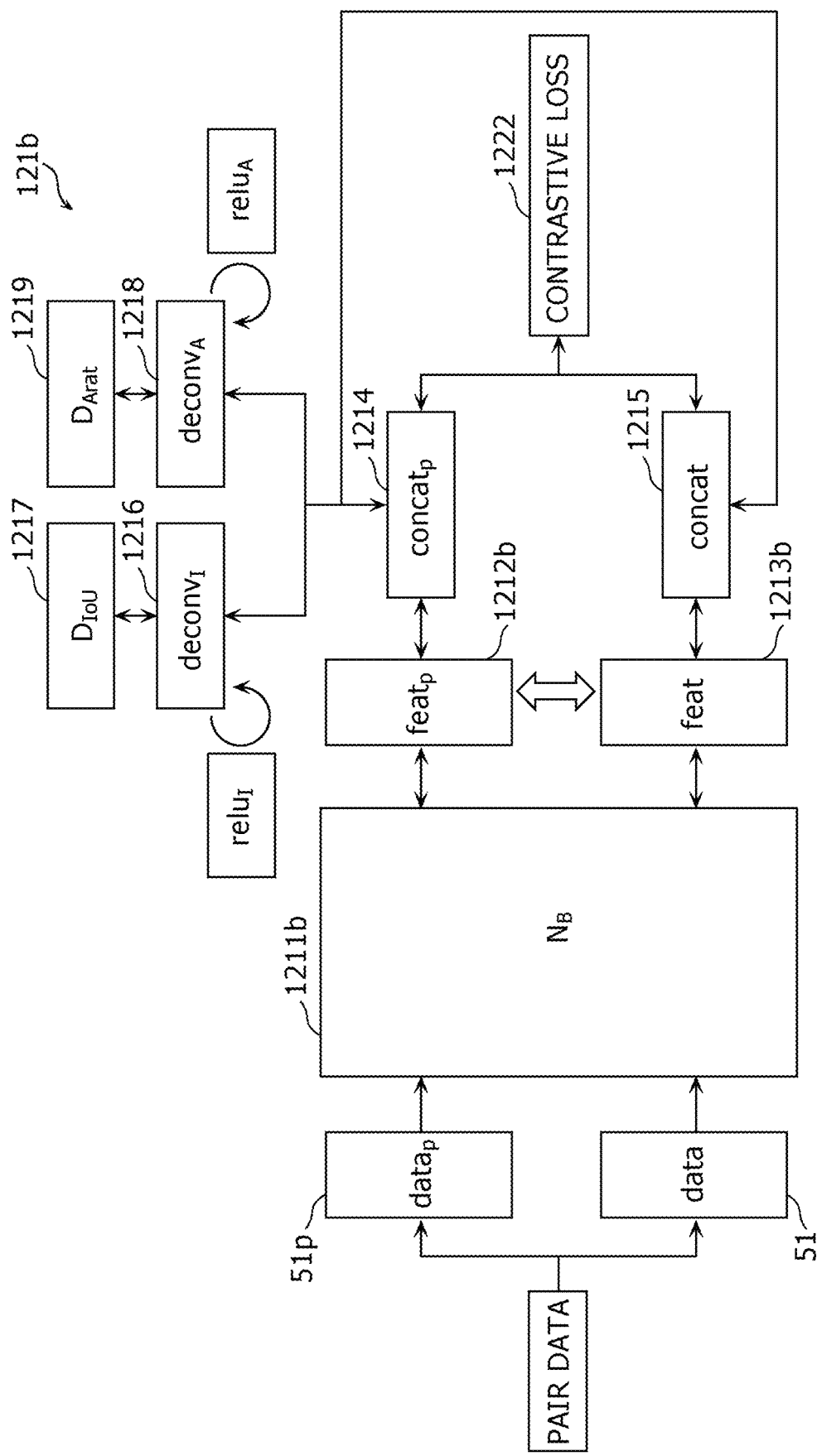
FIG. 12 is an explanatory diagram of an example of the structure of a neural network used in a second-stage training process according to the embodiment.

FIG. 10 is a flowchart illustrating an outline of the training process according to the present embodiment. FIG. 11 is an explanatory diagram of an example of the structure of the base neural network 1211a used in the first-stage training process according to the present embodiment. FIG. 12 is an explanatory diagram of an example of the structure of the neural network 121b used in the second-stage training process according to the present embodiment. Note that elements similar to those in FIGS. 3 and 4 are denoted with like signs, and detailed description of such elements will be reduced or omitted.

<S10>

First, training data is prepared, including multiple matching pairs, which are two images depicting identical objects, and non-matching pairs, which are two images depicting non-identical objects (S10). More specifically, training data to use in the first-stage training process (hereinafter designated the first training process) and training data to use in the second-stage training process (hereinafter designated the second training process) is prepared.

In the present embodiment, for the first training process, training data including multiple matching pairs and non-matching pairs generated from the Market-1501 data set is prepared. Herein, a matching pair is two images of the same size depicting identical objects of the same size. A non-matching pair is two images of the same size depicting non-identical objects of the same size. Also, for the second training process, training data including multiple matching pairs, which are two images depicting identical objects, and non-matching pairs, which are two images depicting non-identical objects, generated from the MOT16 data set is prepared.

<<Market-1501 Data Set>>

The Market-1501 data set includes 1501 identical persons given annotations (correct labels) which are usable for both testing and training, and may be used for re-identification of a person. The Market-1501 data set is collected by six camera from different angles.

<<MOT16 Data Set>>

On the other hand, the MOT16 data set includes seven test sequences usable for testing, such as MOT16-02, 04, 05, 09, 10, 11, and 13, and seven training sequences usable for training, such as MOT16-01, 03, 06, 07, 08, 12, and 14. The training sequences include 79,790 detections, while the test sequences include detections indicating 135,376 pedestrians. A single sequence included in the MOT16 data set is a video sequence taken from a single perspective, and the sequences are collected from various perspectives, such as cameras attached to an automobile, a handheld camera, and the like.

<S11>

Next, the computer uses the training data prepared in S10 to execute the first training process that trains the base neural network 1211a (S11). More specifically, the computer uses training data including multiple matching pairs, which are two images depicting identical objects, and non-matching pairs, which are two images depicting non-identical objects, to execute the first training process that trains parameters for causing the base neural network 1211a to extract features indicating identical objects in the similarity matching by comparison from each of the matching pairs. Herein, the similarity by comparison is scored by comparing the distances of the features of each of the two or more images extracted by the base neural network 1211a. As an example, the similarity by comparison is scored using a loss function using the Euclidean distances of the features of each of the two or more images.

In the present embodiment, the computer executes the first training process using the base neural network 1211a as illustrated in FIG. 11. The base neural network 1211a illustrated in FIG. 11 is additionally provided with a data input layer 51, a data input layer 51p, and a scoring layer 1220.

The data input layer 51 and the data input layer 51p input a matching pair or a non-matching pair into the base neural network 1211 illustrated in FIG. 4. The data input layer 51 inputs one image of a matching pair or a non-matching pair included in the training data prepared for the first training process into the base neural network 1211a. The data input layer 51p inputs the other image of the matching pair or the non-matching pair into the base neural network 1211a.

The scoring layer 1220 scores using the Euclidean distances of features extracted and output by the base neural network 1211a. For example, the scoring layer 1220 computes a loss function using the Euclidean distances according to (Formula 1) and (Formula 2).

$$E_n = \|F - F_p\|_2 \quad (1)$$

$$L_c = \frac{1}{2N} \sum_{n=1}^{N} (y)E_n^2 + (1-y)\max(m - E_n, 0)^2 \quad (2)$$

Herein, $E_n$ indicates the Euclidean distance between a feature $F_p$ output from the feature layer 1212a and a feature F output from the feature layer 1213a. Also, y in (Formula 2) indicates a label of the two images input from the data input layer 51 and the data input layer 51p. Herein, y=1 indicates that the two images are a matching pair, while y=0 indicates that the two images are a non-matching pair. Also, m is a margin parameter, and functions as a countermeasure when features indicating oneness cannot be extracted in the case in which the objects depicted in the two images are non-identical. In the present embodiment, m=3 is set.

In S11, the computer adjusts or updates the parameters of the base neural network 1211a so that the loss computed in the scoring layer 1220 becomes smaller. Herein, the parameters are weights of the convolution layers and the fully-connected layers constituting the base neural network 1211a, and weights shared between the feature layer 1212a and the feature layer 1213a. The computer adjusts or updates the parameters until the loss computed in the first training process reaches a minimum or ceases to fluctuate.

<S12>

Next, the computer uses the training data prepared in S10 to execute a second training process that trains the neural network 121b reflecting the parameters of the base neural network 1211a trained in S11 (S12). More specifically, the computer uses the training data prepared in S10 to execute the second training process that trains parameters for causing the neural network 121b, in which the parameters trained in S11 are reflected in the base neural network 1211b, to extract features indicating identical objects in the similarity matching by comparison from each of the matching pairs.

In the present embodiment, the computer executes the second training process using the neural network 121b as illustrated in FIG. 12. In the neural network 121b illustrated in FIG. 12, a scoring layer 1222 has been added. Note that in the neural network 121b illustrated in FIG. 12, the parameters trained in S11 are reflected in the base neural network 1211b and temporarily locked.

The data input layer 51 inputs one image of a matching pair or a non-matching pair included in the training data prepared for the second training process into the base neural network 1211b. The data input layer 51p inputs the other image of the matching pair or the non-matching pair into the base neural network 1211b.

The scoring layer 1222 computes a loss function for scoring the features output by the feature layer 1212b and the feature layer 1213b using the Euclidean distances with respect to the neural network 121a. Similarly to the scoring layer 1220, the scoring layer 1222 may compute a loss function using the Euclidean distances according to (Formula 1) and (Formula 2), for example. In this case, the feature $F_p$ in (Formula 1) may be taken to be the concatenation of the features output from the feature layer 1212b and the additional features computed by the additional layer 1217 and the additional layer 1219. Also, the feature F in (Formula 1) may be taken to be the concatenation of the features output from the feature layer 1213b and the additional features computed by the additional layer 1217 and the additional layer 1219. Additionally, $E_n$ may be taken to be the Euclidean distance between the feature $F_p$ and the feature F.

Note that the additional features computed by the additional layer 1217 and the additional layer 1219 may be computed by (Formula 3) below.

$$[D_{IoU}, D_{Arat}](b_i, b_j) = \left[\frac{\text{area}(b_i \cap b_j)}{\text{area}(b_i \cup b_j)}, \frac{\min(\text{area}(b_i), \text{area}(b_j))}{\max(\text{area}(b_i), \text{area}(b_j))}\right] \quad (3)$$

Herein, $b_i$ and $b_j$ are boxes indicating areas that include the objects depicted in each of the two images input into the data input layer 51 and the data input layer 51p. The additional layer 1217 computes $D_{IoU}$ as an additional feature, while the additional layer 1219 computes $D_{ARAT}$ as an additional feature.

In S12, the computer executes the second training process with the parameters trained in S11 reflected in the base neural network 1211b of the neural network 121b illustrated in FIG. 12, but in the first phase, the parameters are locked.

In other words, in the first phase of the second training process, the computer locks the parameters of the base neural network 1211b, and trains only the parameters shared between the feature layer 1212b and the feature layer 1213b using the training data prepared for the second training process. Specifically, the computer adjusts or updates the parameters shared between the feature layer 1212b and the feature layer 1213b using the training data prepared for the second training process so that the loss computed by the scoring layer 1222 becomes smaller. Herein, in the first phase of the second training process, the parameters are adjusted or updated so that the loss computed by the scoring layer 1222 reaches a minimum or ceases to fluctuate.

Next, once the training of the parameters shared between the feature layer 1212b and the feature layer 1213b ends, the computer unlocks the parameters of the base neural network 1211b, and executes the second training process. In other words, in the last phase of the second training process, the computer trains all parameters of the neural network 121b using the training data prepared for the second training process.

Note that in the second training process, first, training only the parameters shared between the feature layer 1212b and the feature layer 1213b in the first phase is for utilizing the parameters of the base neural network 1211a trained in the first training process. Hypothetically, assume that in the second training process, all parameters of the neural network 121b are trained using the training data prepared for the second training process, without providing the first and last phases. In this case, the parameters trained in the first training process may become greatly altered, and there is a possibility of not only a drop in training efficiency, but also non-convergence of the parameters.

In the present embodiment, by executing such a two-stage training process, the parameters of the neural network 121a to use in the object tracking apparatus 10 may be trained.

[Effects and the Like of Object Tracking Apparatus 10]

As above, according to the object tracking apparatus 10 in the present embodiment, an enhanced siamese neural network is used to incorporate position variants and area variants as additional features into a feature map that indicates the similarity in an image of tracking candidates in input images input chronologically, and in addition, the additional features may be acquired at a dimensionality greatly reduced compared to the dimensionality of the input images. Additionally, by comparing the acquired feature maps and matching the similarity of tracking candidates in the input images input chronologically, object tracking may be executed. In this way, by using an enhanced siamese neural network, the object tracking apparatus 10 in the present embodiment is able to match the similarity of tracking candidates using feature maps that account for temporal information with reduced dimensionality. With this arrangement, the object tracking apparatus 10 in the present embodiment is able to more quickly process object tracking utilizing a recurrent neural network. In other words, according to the object tracking apparatus 10 in the present embodiment, the processing speed of object tracking using deep learning may be improved. Consequently, the object tracking apparatus 10 in the present embodiment may be applied to a system where real-time object tracking is demanded, such as ADAS.

(Modifications)

In the foregoing embodiment, a case in which the neural network used in the object tracking apparatus 10 is an enhanced siamese neural network is described, but the neural network is not limited thereto. The neural network used in the object tracking apparatus 10 may also be a siamese neural network, or in other words, include only the base neural network 1211 and the feature layers 1212 and 1213. In this case, in the training process illustrated in FIG. 10, it is sufficient to execute the first training process of S11 and the second training process of S12 on the configuration illustrated in FIG. 11, that is, the base neural network 1211a.

Note that only the first training process of S11 may also be executed on the configuration illustrated in FIG. 11, that is, the base neural network 1211a. In other words, the computer uses the training data prepared in S10 and training images including multiple matching pairs, which are two or more images depicting identical objects, and non-matching pairs, which are two or more images depicting non-identical objects, to execute a training process that trains the parameters for causing the neural network made up of the base neural network 1211a to extract features indicating identical objects in the similarity matching by comparison from each of the matching pairs.

WORKING EXAMPLE 1

The effectiveness of the two-stage training process for the case in which the neural network used in the object tracking apparatus 10 is a siamese neural network or an enhanced siamese neural network was verified, and the experiment results will be described as Working Example 1.

[Data Set]

(Training Data Used in First Training Process)

From the Market-1501 data set, 75,000 sets of matching pairs in which identical persons of the same size 64 (w)×64 (h) are randomly selected in two different images of the same size of 128 (w)×128 (h) were generated. Also, from the Market-1501 data set, 75,000 sets of non-matching pairs in which different persons of the same size 64 (w)×64 (h) are randomly selected in two different images of the same size of 128 (w)×128 (h) were generated. Additionally, data including the above was treated as the training data to use in the first training process. Also, to test the effectiveness of the first training process, 25,000 sets of matching pairs and non-matching pairs as above were generated.

(Training Data Used in Second Training Process)

The seven test sequences included in the MOT16 data set do not have ground truth information, that is, correct answer information. Accordingly, the seven training sequences included in the MOT16 data set were divided into six training sequences and one testing sequence. In the six sequences, a total of approximately 222,400 matching pairs and non-matching pairs as well as data indicating IoU (position variants) and AreaRatio (area variants) are generated from two consecutive frames, and treated as the training data to use in the second training process. In the remaining sequence, a total of approximately 198,800 matching pairs and non-matching pairs as well as data indicating IoU (position variants) and AreaRatio (area variants) are generated from two consecutive frames, and used for testing the effectiveness of the second training process.

[Effectiveness of First Training Process]

In the first training process, the training data generated from the Market-1501 data set is used to train the base neural network 1211a by a stochastic gradient descent method in which a single batch size is set to 128, and the learning rate is set to 0.01.

Figure 13:
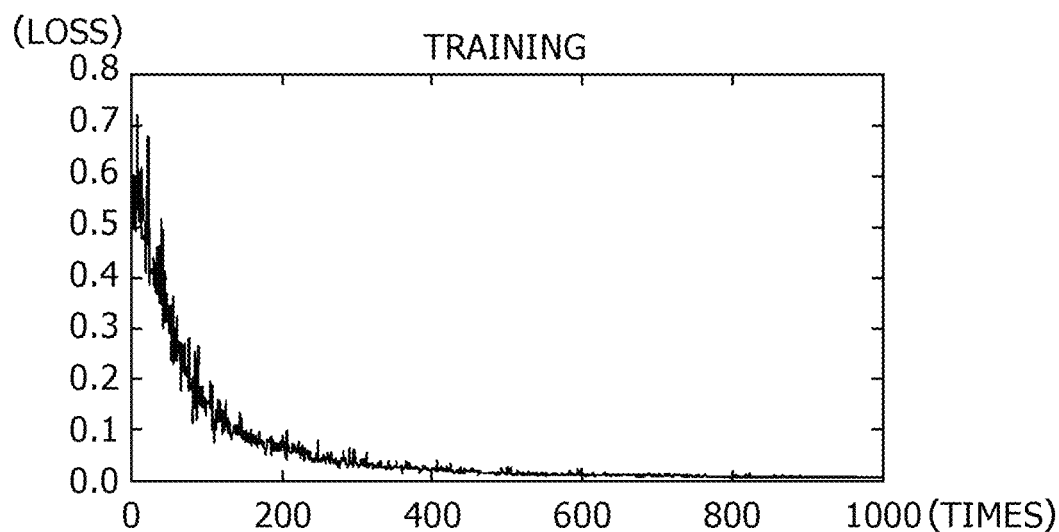
FIG. 13 is a diagram illustrating training loss using the Market-1501 data set according to Working Example 1.
Figure 14:
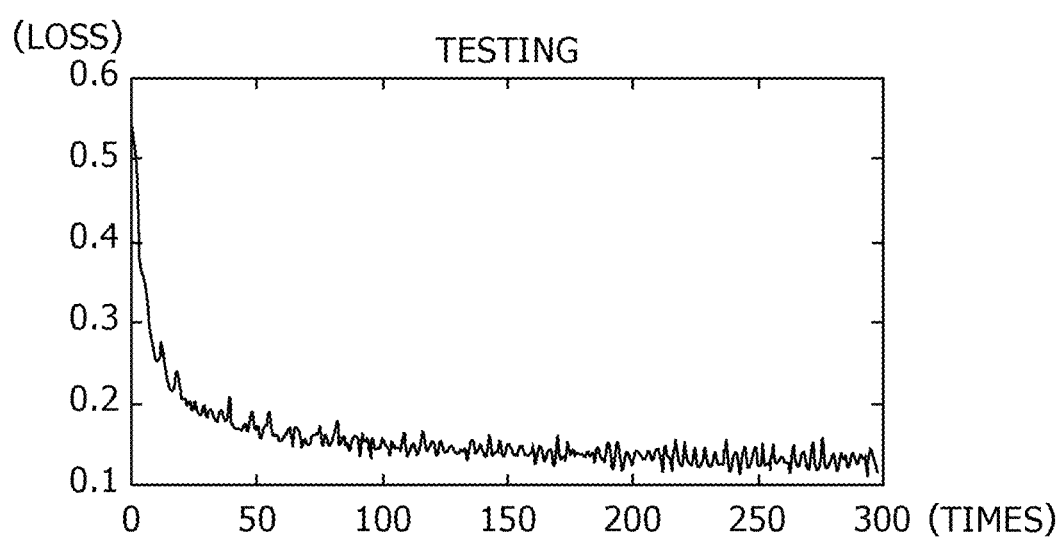
FIG. 14 is a diagram illustrating testing loss using the Market-1501 data set according to Working Example 1.

FIG. 13 is a diagram illustrating training loss using the Market-1501 data set according to Working Example 1. FIG. 14 is a diagram illustrating testing loss using the Market-1501 data set according to Working Example 1. The vertical axis represents loss, while the horizontal axis represents a count in which one count equals 100 iterations. FIG. 14 illustrates the results of testing with the base neural network 1211a after the first training process for the count in FIG. 13.

As a result of testing with the Market-1501 data set, the base neural network 1211a after the first training process achieved precision=0.9854, recall=0.9774, and $F_1$=0.9814. Note that the $F_1$ score may be computed according to (Formula 4) below.

$$F_1 = \frac{2TP}{2TP + FP + FN} \quad (4)$$

Herein, TP indicates the number of true positives, that is, an output data count in which, when divided into the two classes of positive and negative, the truth is positive and the prediction result is also positive. FP indicates the number of false positives, that is, the output data count in which the truth is negative and the prediction result is positive. FN indicates the number of false negatives, that is, the output data count in which the truth is positive and the prediction result is negative.

Figure 15A:
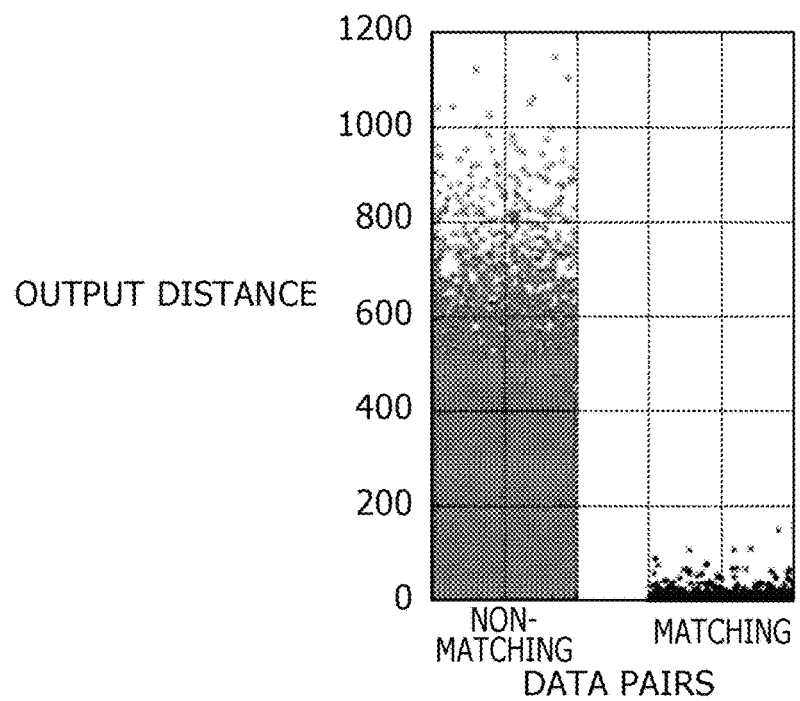
FIG. 15A is a diagram illustrating the Euclidean distance of features obtained using the Market-1501 data set for testing according to Working Example 1.
Figure 15B:
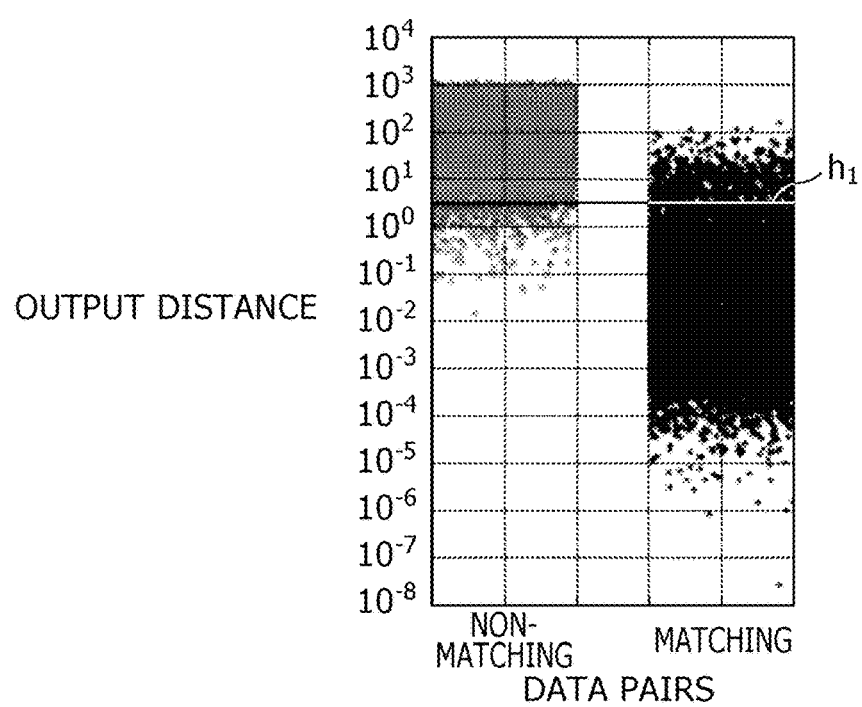
FIG. 15B is a diagram illustrating the Euclidean distance of features obtained using the Market-1501 data set for testing according to Working Example 1.

FIGS. 15A and 15B are diagrams illustrating the Euclidean distance of features obtained using the Market-1501 data set for testing according to Working Example 1. The vertical axis represents the Euclidean distance of two features output by the trained base neural network 1211a. On the horizontal axis, the graph on the left side indicates, on a linear and a logarithmic scale, the Euclidean distance of two features output when non-matching pairs are input into the base neural network 1211a after the first training process. On the vertical axis, the graph on the right side indicates, on a linear and a logarithmic scale, the Euclidean distance of two features output when matching pairs are input into the base neural network 1211a after the first training process. Note that FIG. 15B corresponds to the result of converting the vertical axis in FIG. 15A to a logarithmic scale.

As illustrated in FIG. 15B, in the base neural network 1211a after the first training process, it is demonstrated that in general, the similarity may be classified by two features extracted from the matching pairs and the non-matching pairs by taking a horizontal line $h_1$ (m=3) as a boundary. In other words, it is demonstrated that the base neural network 1211a after the first training process extracts features indicating identical objects for matching pairs, and extracts features indicating non-identical objects for non-matching pairs.

[Effectiveness of Second Training Process]

In the second training process, as described above, first, the parameters trained by the first training process are reflected in the base neural network 1211b constituting part of the neural network 121b. Next, the training data generated from the MOT16 data set is used to train the neural network 121b while locking the parameters of the base neural network 1211b in the first phase. Additionally, in the last phase, the parameters of the base neural network 1211b are unlocked, and the neural network 121b is trained.

As a result of testing with the MOT16 data set, precision=0.9837, recall=0.9966, and $F_1$=0.9901 were achieved from just the base neural network 1211b after the second training process. Also, precision=0.9908, recall=0.9990, and $F_1$=0.9949 were achieved from the neural network 121b after the second training process.

Figure 16A:
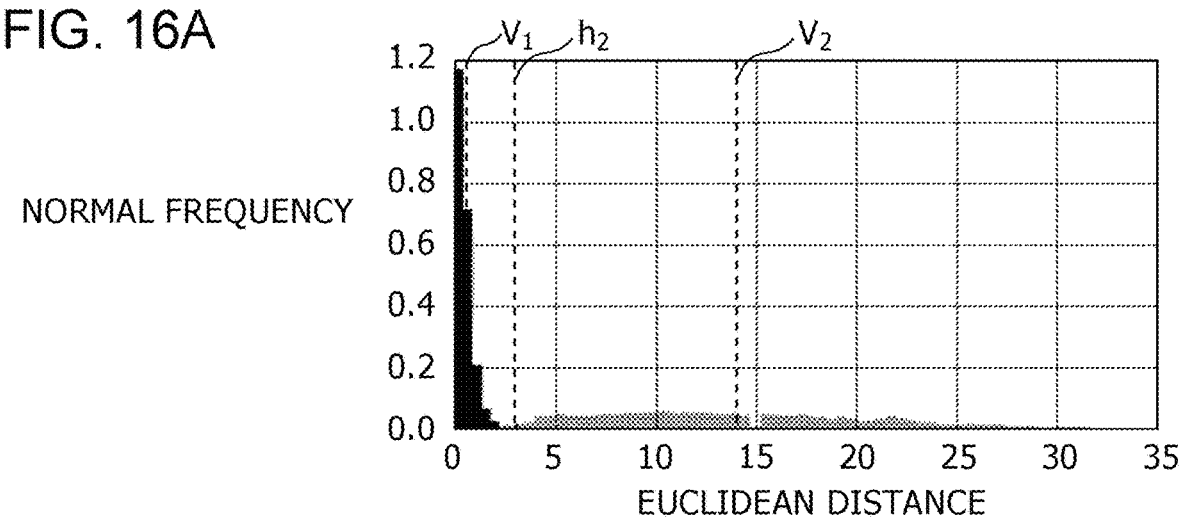
FIG. 16A is a diagram illustrating the Euclidean distance of features obtained using the Mot16 data set for testing according to Working Example 1.
Figure 16B:
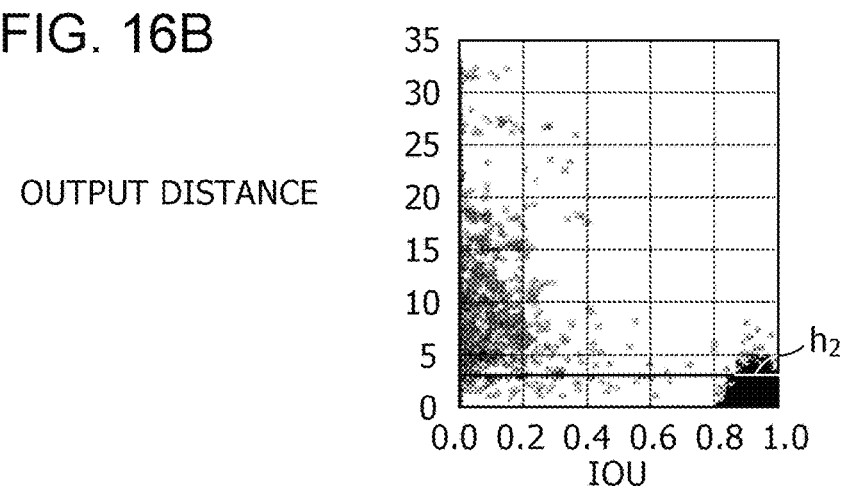
FIG. 16B is a diagram illustrating the Euclidean distance of features obtained using the Mot16 data set for testing according to Working Example 1.
Figure 16C:
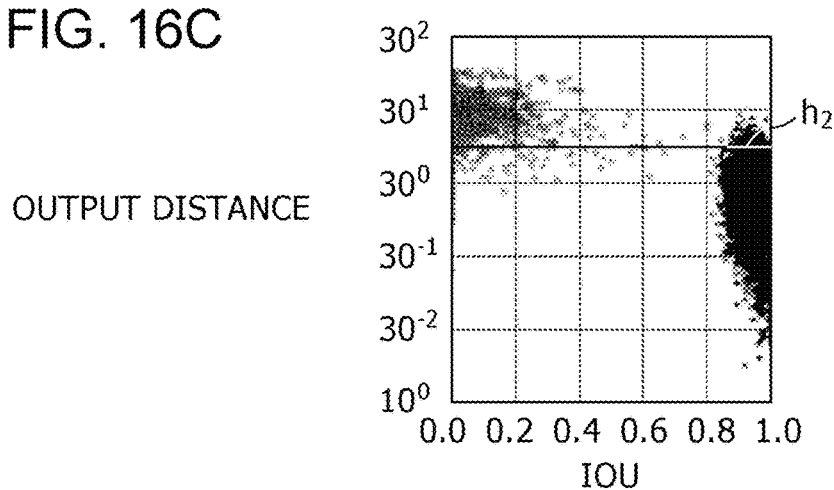
FIG. 16C is a diagram illustrating the Euclidean distance of features obtained using the Mot16 data set for testing according to Working Example 1.
Figure 17A:
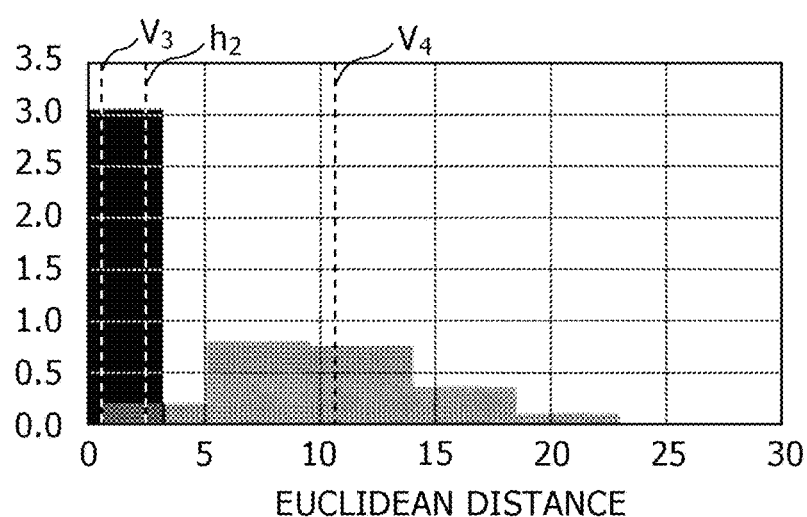
FIG. 17A is a diagram illustrating the Euclidean distance of features obtained using the Mot16 data set for testing according to Working Example 1.
Figure 17B:
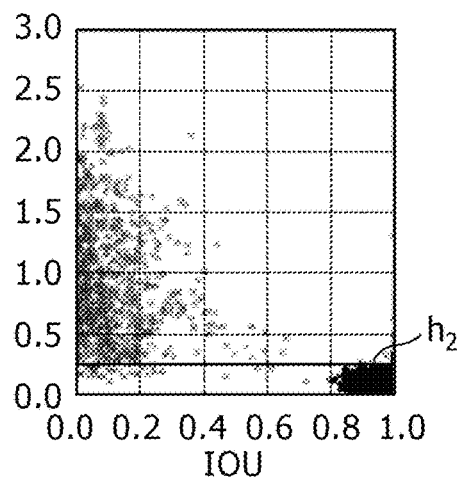
FIG. 17B is a diagram illustrating the Euclidean distance of features obtained using the Mot16 data set for testing according to Working Example 1.
Figure 17C:
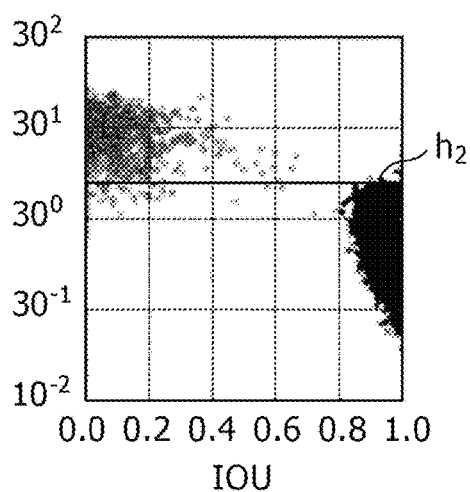
FIG. 17C is a diagram illustrating the Euclidean distance of features obtained using the Mot16 data set for testing according to Working Example 1.

FIGS. 16A to 17C are diagrams illustrating the Euclidean distance of features obtained using the Mot16 data set for testing according to Working Example 1. FIGS. 16A to 16C illustrate the Euclidean distance of two features obtained by the base neural network 1211b after the second training process. FIGS. 17A to 17C illustrate the Euclidean distance of two features obtained by the neural network 121b after the second training process. In these diagrams, the dark-colored points represent features extracted from matching pairs, while the light-colored points represent features extracted from non-matching pairs.

More specifically, FIG. 16A illustrates a histogram of the Euclidean distance of two features obtained by the base neural network 1211b after the second training process. The vertical axis indicates the normalized frequency, while the horizontal axis represents the Euclidean distance. Note that the dashed line $v_1$ indicates the mean value of the Euclidean distance of two features extracted from the matching pairs, while the dashed line $v_2$ indicates the mean value of the Euclidean distance of two features extracted from the non-matching pairs. FIG. 16B is a plot of the results in FIG. 16A with IoU (area of intersection/area of union) on the horizontal axis, and linear-scale Euclidean distance on the vertical axis. FIG. 16C is a plot of the results in FIG. 16A with IoU (area of intersection/area of union) on the horizontal axis, and logarithmic-scale Euclidean distance on the vertical axis. Note that FIG. 16C corresponds to the result of converting the vertical axis in FIG. 16B to a logarithmic scale.

FIG. 17A illustrates a histogram of the Euclidean distance of two features obtained by the base neural network 1211b after the second training process. The vertical axis indicates the normalized frequency, while the horizontal axis represents the Euclidean distance. Note that the dashed line $v_3$ indicates the mean value of the Euclidean distance of two features extracted from the matching pairs, while the dashed line $v_4$ indicates the mean value of the Euclidean distance of two features extracted from the non-matching pairs. FIG. 17B is a plot of the results in FIG. 17A with IoU (area of intersection/area of union) on the horizontal axis, and linear-scale Euclidean distance on the vertical axis. FIG. 17C is a plot of the results in FIG. 17A with IoU (area of intersection/area of union) on the horizontal axis, and logarithmic-scale Euclidean distance on the vertical axis. Note that FIG. 17C corresponds to the result of converting the vertical axis in FIG. 17B to a logarithmic scale.

As illustrated in FIG. 16C, in the base neural network 1211b after the second training process, it is demonstrated that in general, the similarity may be classified by two features extracted from the matching pairs and the non-matching pairs by taking a horizontal line $h_2$ (m=3) as a boundary. Also, as illustrated in FIG. 17C, in the neural network 121b after the second training process, it is demonstrated that the similarity may be classified by features extracted from the matching pairs and the non-matching pairs by taking the horizontal line $h_2$ (m=3) as a boundary. Additionally, a comparison of FIG. 16C and FIG. 17C demonstrates that the similarity may be classified more effectively in the example illustrated in FIG. 17C. In other words, it is demonstrated that the neural network 121b after the second training process more effectively extracts features indicating identical objects for matching pairs, and features indicating non-identical objects for non-matching pairs. For example, it is demonstrated that features of non-matching pairs with IoU<0.05 which are incorrectly classified by the base neural network 1211b after the second training process are correctly classified by the neural network 121b after the second training process. This means that in the neural network 121b after the second training process, by utilizing information indicating position variants and area variants such as the IoU and AreaRatio, similar features extracted from different persons wearing similar clothing, for example, may be identified as features extracted from different persons.

Figure 18A:
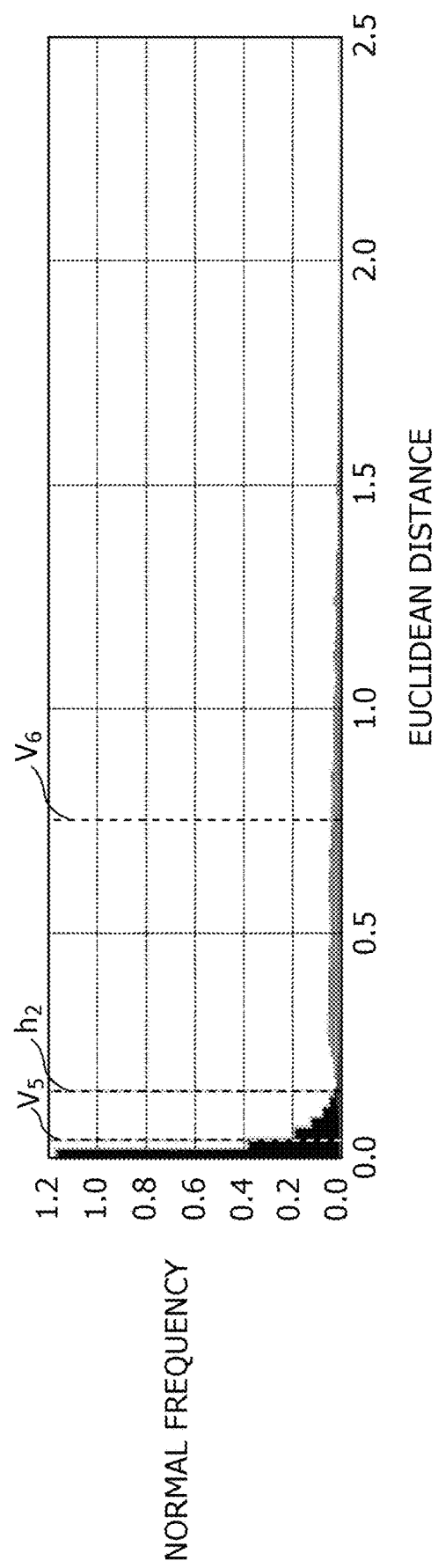
FIG. 18A is a diagram illustrating the Euclidean distance of features obtained using the Mot16 data set for training according to Working Example 1.
Figure 18B:
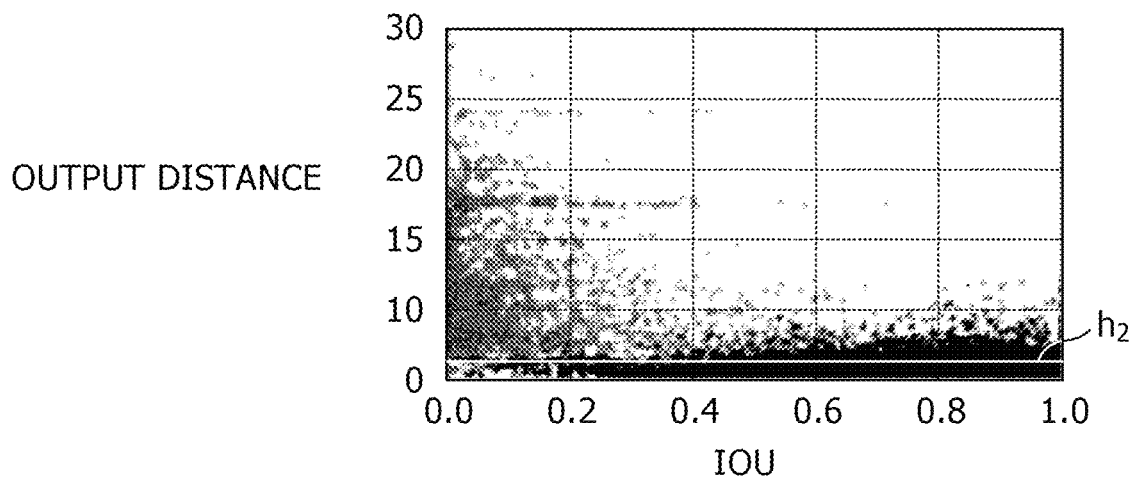
FIG. 18B is a diagram illustrating the Euclidean distance of features obtained using the Mot16 data set for training according to Working Example 1.
Figure 18C:
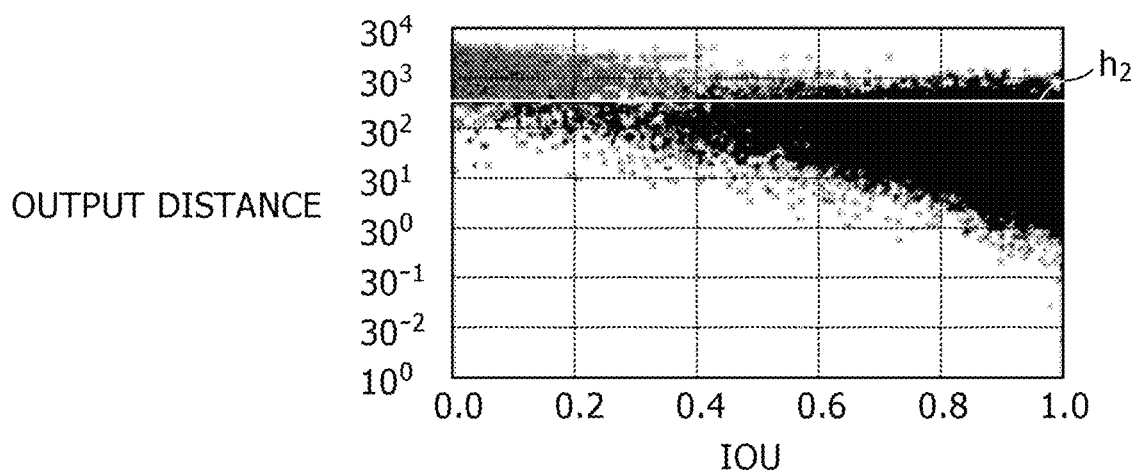
FIG. 18C is a diagram illustrating the Euclidean distance of features obtained using the Mot16 data set for training according to Working Example 1.
Figure 19A:
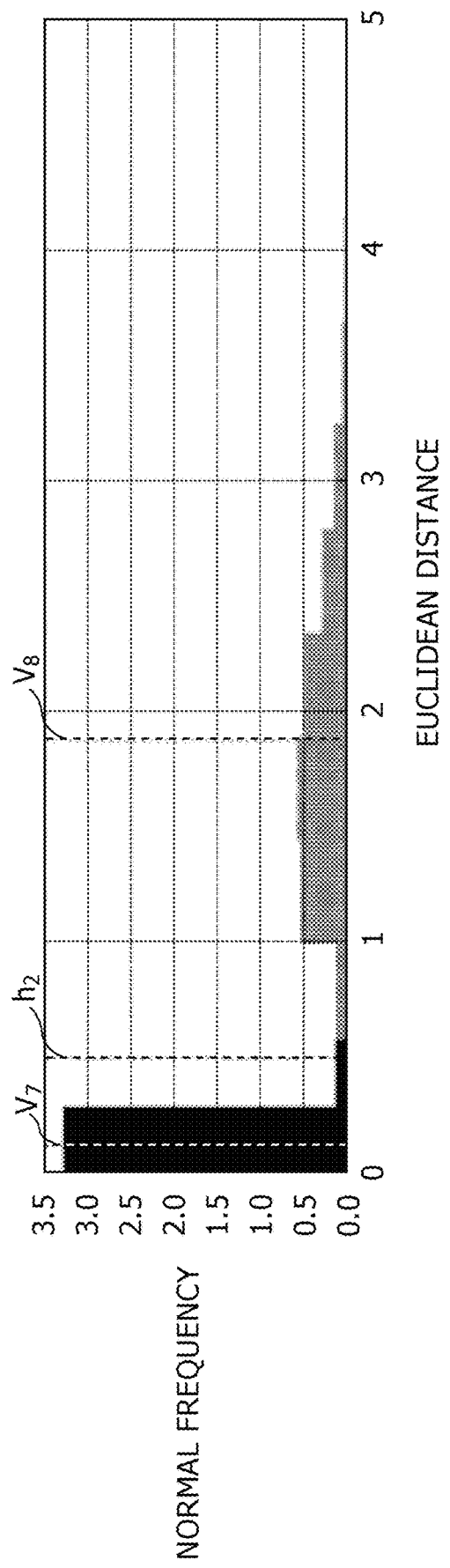
FIG. 19A is a diagram illustrating the Euclidean distance of features obtained using the Mot16 data set for training according to Working Example 1.
Figure 19B:
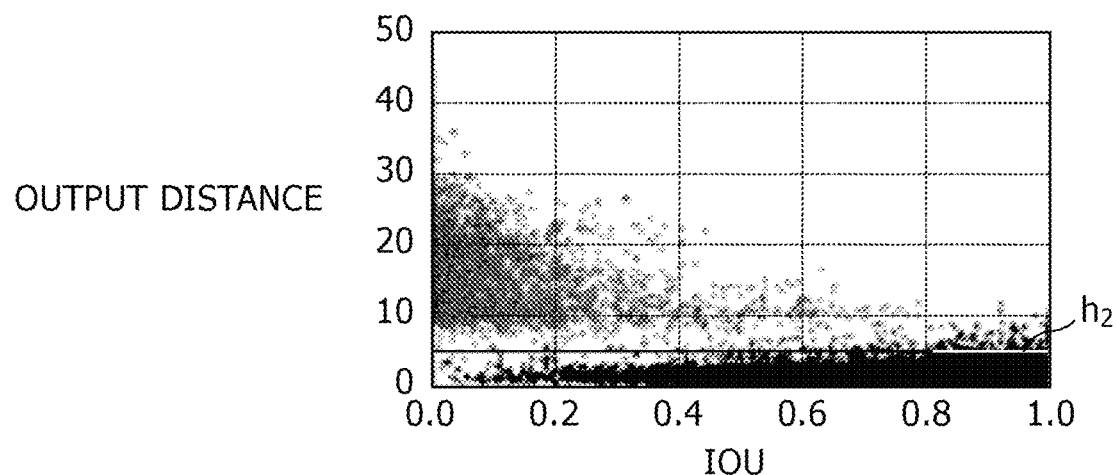
FIG. 19B is a diagram illustrating the Euclidean distance of features obtained using the Mot16 data set for training according to Working Example 1.
Figure 19C:
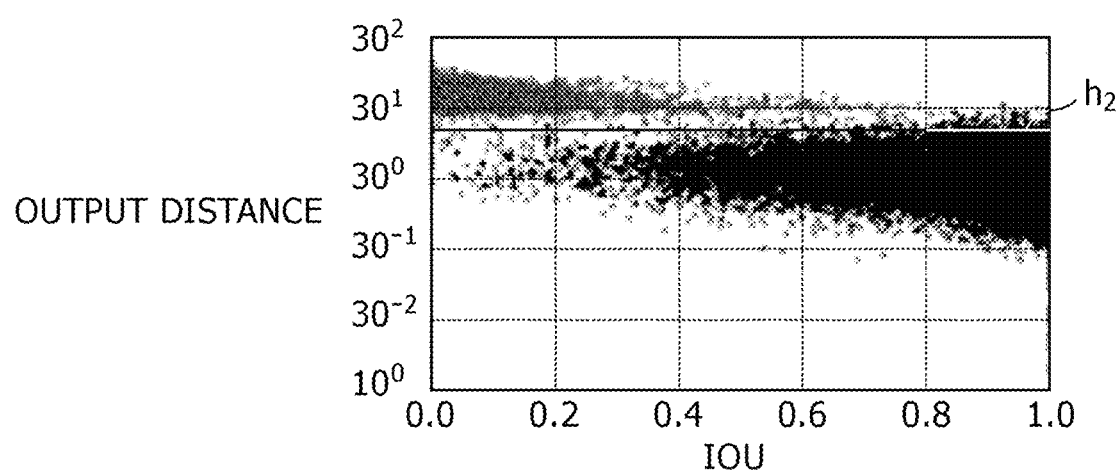
FIG. 19C is a diagram illustrating the Euclidean distance of features obtained using the Mot16 data set for training according to Working Example 1.

FIGS. 18A to 19C are diagrams illustrating the Euclidean distance of features obtained using the Mot16 data set for training according to Working Example 1. FIGS. 18A to 19C are diagrams similar to FIGS. 16A to 17C, except that the MOT16 data set is used for training. In FIG. 18A, the dashed line $v_5$ indicates the mean value of the Euclidean distance of two features extracted from the matching pairs by the base neural network 1211b after the second training process, while the dashed line $v_6$ indicates the mean value of the Euclidean distance of two features extracted from the non-matching pairs by the base neural network 1211b after the second training process. Similarly, in FIG. 19A, the dashed line $v_7$ indicates the mean value of the Euclidean distance of two features extracted from the matching pairs by the neural network 121b after the second training process, while the dashed line $v_8$ indicates the mean value of the Euclidean distance of two features extracted from the non-matching pairs by the neural network 121b after the second training process.

[Algorithm]

FIG. 20 is a diagram illustrating an example of a designated algorithm according to Working Example 1. FIG. 20 illustrates an example of a designated algorithm used to match similarity by comparing features extracted by the base neural networks 1211a and 1211b, and features extracted by the neural network 121b.

In this working example, similarity matching of features extracted by the base neural networks 1211a and 1211b is executed using a score function $S_{new}$ which may be computed according to (Formula 5) to (Formula 8) below.

$$S_{New} = S_{Dist} + S_{IoU} S_{Arat} \quad (5)$$

$$S_{Dist}(b_i, b_j) = \gamma \log_{0.3}\{\max(\gamma, D_{siam}(b_i, b_j))\} \quad (6)$$

$$S_{IoU}(b_i, b_j) = 1.0 + \frac{\text{area}(b_i \cap b_j)}{\text{area}(b_i \cup b_j)} \quad (7)$$

$$S_{Arat}(b_i, b_j) = e^{\frac{\min(\text{area}(b_i),\text{area}(b_j))}{\max(\text{area}(b_i),\text{area}(b_j))} - \delta} \quad (8)$$

Herein, $b_i$ and $b_j$ are boxes indicating areas that include objects such as persons depicted in each of the two chronologically consecutive images $B_{t-1}$ and $B_t$ input into the data input layers 51 and 51p illustrated in FIG. 11 or FIG. 12. As indicated in (Formula 6), $S_{Dist}$ indicated in (Formula 5) may be derived from the Euclidean distance $D(b_i, b_j)$ of the features extracted by the base neural networks 1211a and 1211b from $b_i$ and $b_j$, and a bias term $\gamma$. As indicated in (Formula 7), $S_{IoU}$ may be derived by shifting the IoU (position variant) of bi and bj by 1.0. As indicated in (Formula 8), $S_{Arat}$ may be derived from the AreaRatio (area variant) of $b_i$ and $b_j$.

Also, in this working example, the matching of similarity according to features extracted by the neural network 121b is executed using $S_{Dist}$ which may be computed according to (Formula 6) below.

From the above, similarity matching according to features may be executed using the score function $S_{new}$ indicated in (Formula 9) below. In other words, when executing similarity matching according to the features extracted by the base neural network, it is sufficient to use IoU, AreaRatio, and the Euclidean distance. Also, when executing similarity matching according to the features extracted by the neural network obtained by enhancing the base neural network, it is sufficient to use only the Euclidean distance.

$$S_{Net} = \begin{cases} S_{New}, & \text{if Net} = N_B \\ S_{Dist}, & \text{otherwise} \end{cases} \quad (9)$$

Additionally, in this working example, the score function $S_{new}$ indicated in (Formula 9) is derived using a designated algorithm as illustrated in FIG. 20. Note that n input on Line 1 of FIG. 20 decides how many frames back to search to generate pairs with the current frame. In FIG. 20, in the case in which an object similar to the tracking target object of the current frame is decided, the same ID as the tracking target object of the current frame is assigned.

WORKING EXAMPLE 2

In Working Example 2, the MOT16 Train Data set and the MOT16 Test Data set were used to evaluate the performance of the neural network used in the object tracking apparatus 10, and the effects will be described. Note that in Working Example 2, the neural network used in the object tracking apparatus 10 is taken to be a siamese neural network. In other words, in Working Example 2, performance is evaluated for the neural network used in the object tracking apparatus 10 according to the modification. Also, the use of MOT16 to benchmark the performance of object tracking that tracks multiple target objects is one of the most well-established evaluation methods, and is widely used.

FIG. 21 is a diagram illustrating benchmark results for the MOT16 Train Data set according to Working Example 2. As illustrated in FIG. 21, the highest object tracking accuracy (MOTA) value of 48.6 is the score from the case of using the MOT16-11 sequence. The lowest object tracking accuracy (MOTA) value of 6.2 is the score from the case of using the MOT16-13 sequence. However, the MOT16-13 sequence is known to be the most difficult sequence for object tracking among the sequences included in the MOT16 Train Data set. The mean object tracking accuracy (MOTA) value for the case of using the MOT16 Train Data set is 31.0.

The running time (Hz) is different for each sequence included in the MOT16 Train Data set. This is because the running time depends on the density of the sequence, and as the density of the sequence becomes greater, that is, as the number of target object detections in the image frames becomes greater, the computational cost also becomes greater, thus requiring more time. Note that the running times in the present working examples were evaluated using an NVIDIA GeForce GTX 970 card.

FIG. 22 is a diagram illustrating benchmark results for the MOT16 Test Data set according to Working Example 2. Note that in FIG. 22, "Ours" corresponds to the performance score, that is, the benchmark, of object detection executed by the object tracking apparatus 10 according to the present disclosure. The others are the benchmarks of object detection by methods which do not use a siamese neural network. Also, the benchmarks illustrated in FIG. 22 are executed 1) online, namely, a method that uses current and past information without using future information, and 2) by a method that uses the provided detection set without preparing tracking targets of one's own.

As illustrated in FIG. 22, the object tracking accuracy (MOTA) is 35.2, and the running time (Hz) is 5.6 Hz. Although accurate comparison of running time (Hz), that is, processing speed, is impossible due to a lack of information about the hardware specifications with which the other benchmarks were executed, "Ours" is demonstrated to achieve very competitive performance both in accuracy and processing speed compared to the others.

As above, according to the object tracking apparatus and object tracking method according to the present disclosure, an object tracking method with further improvement in the processing speed of object tracking using deep learning may be realized. Consequently, the object tracking apparatus and object tracking method according to the present disclosure is favorably applicable to systems where real-time object tracking is demanded, such as ADAS.

Possibility of Other Embodiments

The foregoing thus describes an object tracking method of the present disclosure by way of an exemplary embodiment, but the primary agents and devices by which each process is performed are not particularly limited. A process may be executed by a processor or the like (described below) embedded into a specific device disposed locally. Additionally, a process may also be executed by a cloud server or the like disposed in a different location from a local device.

Also, training data or the input images into the object tracking method may be images taken by a car-mounted camera (full images), or images from a part of a full image (partial images). The partial images may be images of an area including a tracking target object. The full images may be images including multiple tracking target objects.

Note that the present disclosure is not limited to the foregoing embodiment. For example, different embodiments realized by arbitrarily combining the structural elements described in this specification, or by removing several structural elements, are also taken to be embodiments of the present disclosure. In addition, persons skilled in the art may apply various changes to the foregoing embodiment without departing from the gist of the present disclosure, that is, the meaning expressed by the language stated in the claims, and any modifications obtained thereby are also included in the present disclosure.

Also, the present disclosure furthermore includes cases like the following.

(1) The above apparatus is specifically a computer system made up of a microprocessor, ROM, RAM, a hard disk unit, a display unit, a keyboard, a mouse, and the like. A computer program is stored in the RAM or the hard disk unit. Each device achieves the respective functions thereof as a result of the microprocessor operating in accordance with the computer program. The computer program herein is made up of a plural combination of instruction codes indicating commands to the computer in order to achieve a designated function.

(2) Some or all of the structural elements constituting the above device may also be configured as a single system large-scale integration (LSI) chip. A system LSI chip is a multi-function LSI chip fabricated by integrating multiple components onto a single chip, and specifically is a computer system including a microprocessor, ROM, RAM, and the like. A computer program is stored in the RAM. The system LSI chip achieves the functions thereof as a result of the microprocessor operating in accordance with the computer program.

(3) Some or all of the structural elements constituting the above device may also be configured as an IC card or a separate module that may be inserted into the device. The IC card or the module is a computer system made up of a microprocessor, ROM, RAM, and the like. The IC card or the module may also include the advanced multi-function LSI chip discussed above. The IC card or module achieves the functions thereof as a result of the microprocessor operating in accordance with the computer program. The IC card or the module may also be tamper-resistant.

(4) The present disclosure may also be taken to be the methods indicated in the foregoing. In addition, these methods may be taken to be a computer program realized by a computer, or a digital signal containing the computer program.

(5) In addition, the present disclosure may also be realized by recording the computer program or the digital signal onto a computer-readable recording medium, such as a flexible disk, hard disk, CD-ROM, MO, DVD, DVD-ROM, DVD-RAM, Blu-ray Disc® (BD), or semiconductor memory, for example. In addition, one aspect of the present disclosure may also be taken to be the digital signal recorded on these recording media.

In addition, the present disclosure may also be realized by transmitting the computer program or the digital signal over an electrical communication link, a wired or wireless communication link, a network such as the Internet, or a data broadcast.

In addition, the present disclosure may also be a computer system equipped with a microprocessor and memory, in which the memory stores the above computer program, and the microprocessor operates according to the computer program.

In addition, one aspect of the present disclosure may also be carried out by another independent computer system by recording and transporting the program or the digital signal on a recording medium, or transporting the program or the digital signal over a medium such as a network.

The present disclosure may be used in an object tracking method, an object tracking apparatus, and a program using deep learning, and more particularly may be used in a system where real-time object tracking is demanded, such as ADAS.

What is claimed is:

1. An object tracking method executed by a computer using a neural network, the object tracking method comprising:
   inputting, into the neural network, two or more chronologically consecutive images, each depicting one or more objects, the two or more chronologically consecutive images including at least a chronologically earlier image and a chronologically later image;
   matching similarity of features of each of the two or more chronologically consecutive images by comparing features extracted by the neural network; and
   outputting, as an identification result, identification information and position information of an object within an image for one or more objects depicted in the chronologically later image, which match one or more tracking candidate objects depicted in the chronologically earlier image, wherein
   the neural network includes two or more identical structures having zero or more fully-connected layers and one or more convolution layers, and shares parameters among corresponding layers across the identical structures, wherein the neural network additionally includes, outside of the two or more identical structures, additional layers that compute:

a position of a target object within an image, and an area ratio of the target object within the image, the area ratio indicating an amount of area corresponding to the target object within the image.

2. The object tracking method according to claim 1, wherein in the inputting, a first image and a second image which are chronologically consecutive, each depicting one or more objects, are input into the neural network, in the outputting, the neural network is made to extract a first feature of each of one or more tracking candidate objects depicted in the first image, and a second feature of each of one or more objects depicted in the second image, and the similarity is matched by comparing the extracted first feature and the second feature, thereby outputting, as the identification result, identification information and position information of an object for one or more objects depicted in the second image that match each tracking candidate object depicted in the first image, and the neural network includes two of the identical structures, and extracts the first feature of the first image and the second feature of the second image with the two identical structures.

3. The object tracking method according to claim 1, wherein in the inputting, a first image, a second image, and a third image which are chronologically consecutive, each depicting one or more objects, are input into the neural network, in the outputting, the neural network is made to extract a first feature of each of one or more tracking candidate objects depicted in the first image, a second feature of each of one or more objects depicted in the second image, and a third feature of each of one or more objects depicted in the third image, and the similarity is matched by comparing the extracted first feature, second feature, and third feature, thereby outputting, as the identification result, identification information and position information of an object for one or more objects depicted in the second image and the third image that match each tracking candidate object depicted in the first image, and the neural network includes three of the identical structures, and extracts the first feature of the first image, the second feature of the second image, and the third feature of the third image with the three identical structures.

4. The object tracking method according to claim 1, further comprising:

executing a training, before executing the inputting, that uses training data including multiple matching pairs, which are two or more images depicting identical objects, and non-matching pairs, which are two or more images depicting non-identical objects, to train parameters for causing the neural network to extract features indicating identical objects in the similarity matching by comparison from each of the matching pairs.

5. The object tracking method according to claim 4, wherein the similarity by comparison is evaluated by comparing a distance of the features of each of the two or more chronologically consecutive images extracted by the two or more identical structures.

6. The object tracking method according to claim 5, wherein the similarity by comparison is evaluated by using a loss function using a Euclidean distance of the features of each of the two or more chronologically consecutive images.

7. The object tracking method according to claim 1, further comprising:

executing a first training, before executing the inputting, that uses training data including multiple matching pairs, which are two or more images depicting identical objects, and nonmatching pairs, which are two or more images depicting non-identical objects, to train parameters for causing the two or more identical structures included in the neural network to extract features indicating identical objects in the similarity matching by comparison from each of the matching pairs; and executing a second training that uses the training data to train the parameters for causing the neural network in which the parameters trained in the first training are reflected in the two or more identical structures to extract features indicating identical objects in the similarity matching by comparison from each of the matching pairs.

8. The object tracking method according to claim 1, wherein each of the two or more identical structures extracts a feature of a corresponding image among the two or more chronologically consecutive images by a dimensionality further reduced than a dimensionality of the corresponding image, and the dimensionality of the features extracted by each of the two or more identical structures is the same.

9. The object tracking method according to claim 1, wherein the one or more objects depicted in the two or more chronologically consecutive images are at least one of a person and a vehicle.

10. The object tracking method according to claim 1, wherein the neural network includes the two or more identical structures having zero fully-connected layers.

11. A non-transitory computer-readable recording medium storing a program causing a computer to execute:

inputting two or more chronologically consecutive images, each depicting one or more objects, into a neural network that includes two or more identical structures having zero or more fully-connected layers and one or more convolution layers, and shares parameters among corresponding layers across the identical structures, and the two or more chronologically consecutive images including at least a chronologically earlier image and a chronologically later image;

matching similarity of features of each of the two or more chronologically consecutive images by comparing features extracted by the neural network; and outputting, as an identification result, identification information and position information of an object within an image for one or more objects depicted in the chronologically later image, which match one or more tracking candidate objects depicted in the chronologically earlier image, wherein the neural network additionally includes, outside of the two or more identical structures, additional layers that compute:

a position of a target object within an image, and
an area ratio of the target object within the image, the area ratio indicating an amount of area corresponding to the target object within the image.

12. An object tracking apparatus comprising:
an input circuit that inputs, into a neural network, two or more chronologically consecutive images, each depicting one or more objects, the two or more chronologically consecutive images including at least a chronologically earlier image and a chronologically later image;
an output circuit that
matches similarity of features of each of the two or more chronologically consecutive images input by the input circuit by comparing features extracted by the neural network; and
outputs, as an identification result, identification information and position information of an object within an image for one or more objects depicted in the chronologically later image, which match one or more tracking candidates depicted in the chronologically earlier image, wherein
the neural network includes two or more identical structures having zero or more fully-connected layers and one or more convolution layers, and shares parameters among corresponding layers across the identical structures,
wherein the neural network additionally includes, outside of the two or more identical structures, additional layers that compute:
a position of a target object within an image, and
an area ratio of the target object within the image, the area ratio indicating an amount of area corresponding to the target object within the image.

* * * * *